US012574967B2

(12) United States Patent  
Sun et al.

(10) Patent No.: US 12,574,967 B2  
(45) Date of Patent: Mar. 10, 2026

(54) LONG PACKET AND QUICK ACKING ON SECONDARY LINK

(71) Applicants: SONY GROUP CORPORATION, Tokyo (JP); SONY CORPORATION OF AMERICA, New York, NY (US)

(72) Inventors: Li-Hsiang Sun, San Jose, CA (US); Mohamed Abouelseoud, Burlingame, CA (US); Liangxiao Xin, Santa Clara, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 558 days.

(21) Appl. No.: 18/067,963

(22) Filed: Dec. 19, 2022

(65) Prior Publication Data

US 2023/0199845 A1 Jun. 22, 2023

Related U.S. Application Data

(60) Provisional application No. 63/265,712, filed on Dec. 20, 2021.

(51) Int. Cl.
| | |
|---|---|
| *H04W 74/0816* | (2024.01) |
| *H04L 1/1607* | (2023.01) |
| *H04L 5/00* | (2006.01) |
| *H04W 84/12* | (2009.01) |

(52) U.S. Cl.
CPC ....... *H04W 74/0816* (2013.01); *H04L 1/1621* (2013.01); *H04L 5/0055* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 11,057,258 B2 | 7/2021 | Cherian | |
| 2017/0373736 A1* | 12/2017 | Fang | H04W 74/06 |
| 2020/0014576 A1* | 1/2020 | Cherian | H04L 1/0026 |
| 2020/0288523 A1 | 9/2020 | Patil | |
| 2021/0045095 A1 | 2/2021 | Cariou | |
| 2021/0120539 A1 | 4/2021 | Xia | |
| 2021/0266891 A1* | 8/2021 | Chu | H04L 5/1469 |
| 2023/0129195 A1* | 4/2023 | Son | H04W 80/02 |
| | | | 370/329 |
| 2025/0048174 A1* | 2/2025 | Sun | H04W 28/0278 |

* cited by examiner

*Primary Examiner* — Saumit Shah  
(74) *Attorney, Agent, or Firm* — O'BANION & RITCHEY LLP; John P. O'Banion

(57) ABSTRACT

A wireless communication protocol which operates with multi-link devices (MLDs) having simultaneous transmit and receive (STR) link pairs to allow transmitting a long MU PPDU by an originator on a first link, which is acknowledged (Ack) by a recipient on a second link. The Ack on the second link may be on a single resource unit (RU) which may be shared by multiple stations. The Ack may be received during the MP PPDU on the first link, making it a quick Ack. In many cases this allows the originator to perform a retransmission within the same PPDU, thus especially benefitting real-time traffic which is latency sensitive.

18 Claims, 20 Drawing Sheets

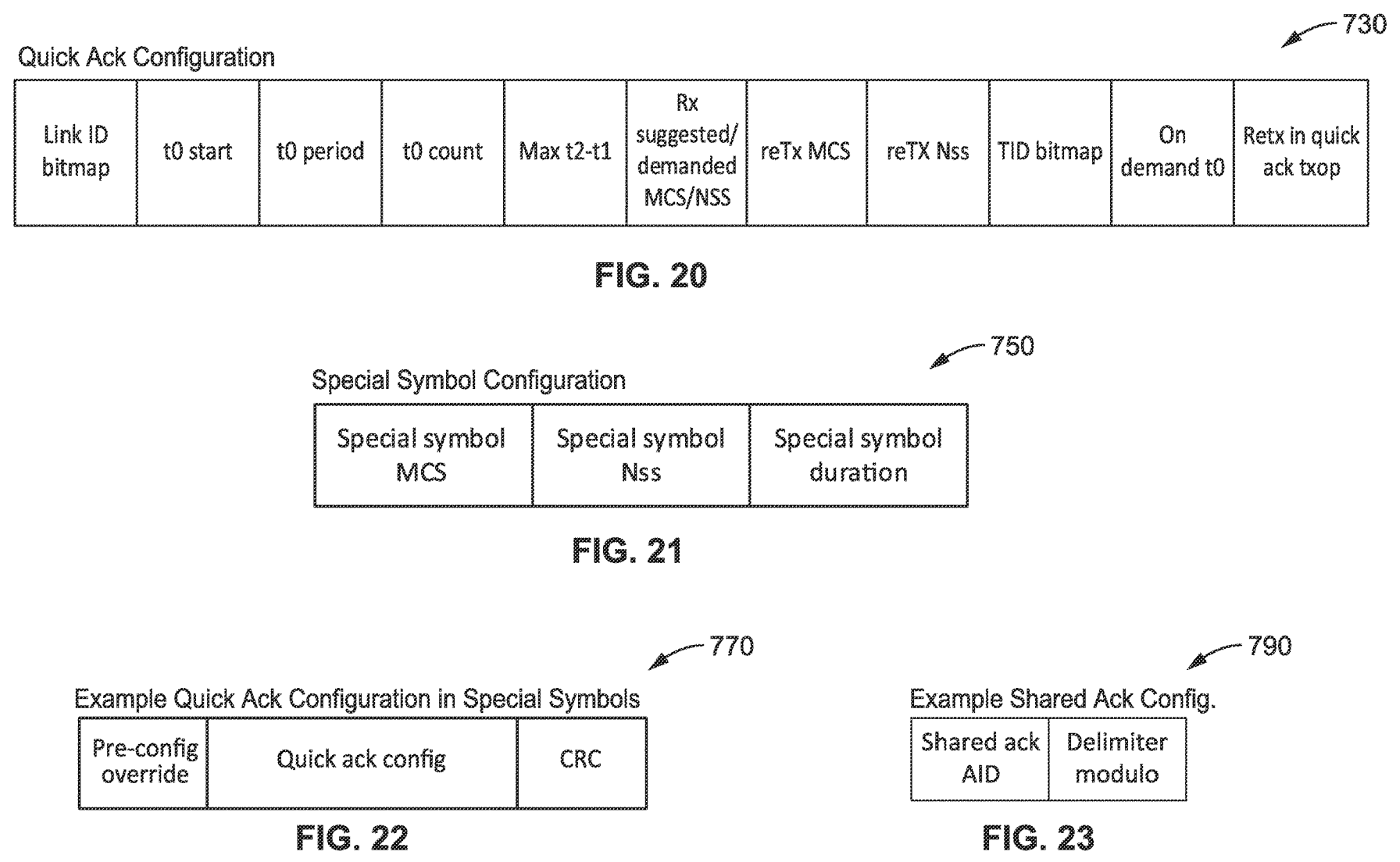

Quick Ack Configuration

| Link ID bitmap | t0 start | t0 period | t0 count | Max t2–t1 | Rx suggested/ demanded MCS/NSS | reTx MCS | reTX Nss | TID bitmap | On demand t0 | Retx in quick ack txop |
|---|---|---|---|---|---|---|---|---|---|---|

FIG. 20

Special Symbol Configuration

| Special symbol MCS | Special symbol Nss | Special symbol duration |
|---|---|---|

FIG. 21

Example Shared Ack Config.

| Shared ack AID | Delimiter modulo |
|---|---|

FIG. 23

Example Quick Ack Configuration in Special Symbols

| Pre-config override | Quick ack config | CRC |
|---|---|---|

FIG. 22

LONG PACKET AND QUICK ACKING ON SECONDARY LINK

CROSS-REFERENCE TO RELATED APPLICATIONS

This application claims priority to, and the benefit of, U.S. provisional patent application Ser. No. 63/265,712 filed on Dec. 20, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communications under CSMA/CA and EDCA, and more particularly to providing quick acknowledgements for long packet traffic.

2. Background Discussion

In the current 802.11 protocol, an Ack/BA immediately follows a PPDU on the same link, and is used by the CSMA/CA protocol to detect collisions, in addition to acknowledging the reception status of each MPDU in the PPDU. A PPDU, for the sake of efficiency, may contain data from multiple users and for each user the data may be of multiple priorities. The multiplexing of different users and priorities increases efficiency, but may create an inordinately long PPDU, which can increase latency.

For a low latency MPDU within a long PPDU, the duration of the PPDU may be too long for the transmitter to perform a retransmission if the receiver indicates reception failure of the low latency MPDU after the long PPDU finishes. The term "Long" in this case is relative to the latency requirement of latency sensitive traffic. The retransmission indicated above after the long PPDU may have violated the latency sensitive traffic's delay bound.

Accordingly, a need exists for a protocol which can handle RTA traffic with reduced latency while making use of a secondary link. The present disclosure fulfills that need and provides additional benefits.

BRIEF SUMMARY

Wireless communication in a IEEE802.11 network is described which can provide for quick acknowledgements, as well as speed up retransmissions. The description is directed primarily to the use of Multiple-Link Devices (MLDs) which have Simultaneous Transmit and Receive (STR) capability, operating on a network using carrier sense multiple access/collision avoidance (CSMA/CA) in which Enhanced Distributed Channel Access (EDCA) is utilized for random channel access on all the links.

The described protocol provides for an originating MLD to send a Physical Layer Protocol Data Unit (PPDU) (e.g., a long PPDU) containing one or more aggregated MAC protocol data units (AMPDUs) on a first link, and to receive acknowledgement (Ack) frame(s), as quick Ack, from a recipient MLD over a second link before the transmission of the PPDU by the originator over the first link has been completed.

This is especially beneficial for latency sensitive MPDUs, such as associated with Real-Time Application (RTA) traffic, being sent early in the PPDU, and which can then be Acked after receipt of the latency sensitive portion, while the remainder of the PPDU is still being transmitted.

The disclosed technology also allows reducing the latency as retransmissions can be performed on either the first and/or second link within the same long PPDU.

The present disclosure provides numerous options/modes/and configurations for controlling the manner in which these quick Acks and retransmissions are performed.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 20 is a data field diagram of a quick Ack configuration field, according to at least one embodiment of the present disclosure.

FIG. 21 is a data field diagram of a Special Symbol configuration field, according to at least one embodiment of the present disclosure.

FIG. 22 is a data field diagram of a quick Ack configuration, according to at least one embodiment of the present disclosure.

FIG. 23 is a data field diagram of a Shared Ack Configuration element, according to at least one embodiment of the present disclosure.

DETAILED DESCRIPTION

1. Motivation and Assumption

Figure 1:
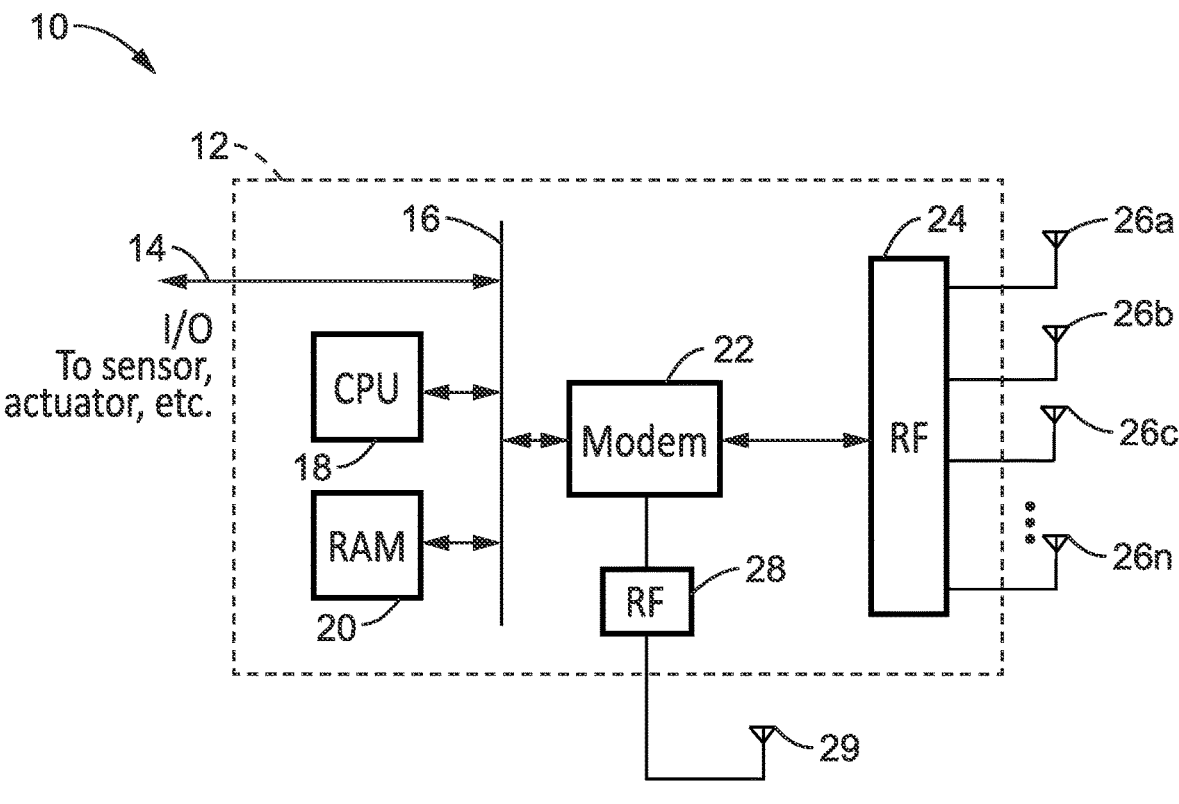
FIG. 1 is a block diagram of station (STA) hardware according to at least one embodiment of the present disclosure.

The current state of the art in this area is found in IEEE P802.11be™/D2.3, November 2022 and IEEE P802.11-REVme™/D2.0, October 2022.

A station (STA) having Real-Time Application (RTA) data may transmit PPDU containing only short RTA data and solicit immediate acknowledgment for minimizing delay in case of retransmission. However, for various reasons, the Access Point (AP) or non-AP station (STA) may consider the system efficiency or other access rules and decide not to send a PPDU containing only RTA data. For example, to exploit Downlink (DL) Multiple-User (MU) Multiple-Input Multiple-Output (MIMO) (by using otherwise unused antenna/precoding vectors to send data to multiple users in the same PPDU), the AP may transmit a MU PPDU, causing the RTA user's PSDU to be padded to be the same size as other user's PSDU length. For another example, the PPDU is a UL Trigger based PPDU (TB-PPDU), and the length of the PPDU is determined by the AP. If a STA includes RTA data in the PSDU, the scheduled PPDU duration does not change, and it needs to include other data or padding to satisfy the required PSDU length for the TB-PPDU. In these situations of the STA or AP sending a relatively long PPDU containing a short RTA data, the station (STA) or AP having Real-Time Application (RTA) data may seek a quick acknowledgement (Ack), so that it may for example perform a retry before the MSDU lifetime expires, and before the end of the ongoing PPDU, when there is a second link for performing an acknowledgement (Ack).

The transmitter can send a short PPDU and receive a Block Acknowledgement (BA) quickly on the same link. However, in this case the transmitter is sacrificing the efficiency of a Multi-User (MU) transmission; as it cannot be multiplexing data to/from other users in the spatial and/or frequency domain.

There are opportunities for using a long PPDU on a first link and an Ack on a second link. A long MU PPDU having obtained the channel, despite being of a low priority Access Class (AC), may contain significant levels of padding which may be utilized to provide access for high priority traffic of other users, such as for use in retransmissions.

It takes less than 16 microseconds to build (construct) a long AMPDU to respond to a Trigger Frame (TF), so it is possible that a late arriving (after TXOP starts) RTA MPDU can be inserted into an ongoing AMPDU (to the same receiver) instead of aborting the ongoing AMPDU by a lower priority AC.

If the transmitter receives a Block Acknowledgement (BA) before the entire AMPDU is completely received, wherein this can allow retransmission in the same AMPDU, as well as other retransmission options.

In these discussions, Multi-Link Devices (MLDs) in this disclosure are considered to provide Simultaneous Transmit and Receive (STR) on discussed links. The MLD sending the data MPDUs to be Ack'ed is referred to as the "originator" MLD; while the MLD sending an Ack in response to receiving data MPDUs is referred to herein as the "recipient" MLD. A Traffic Identifier (TID) is utilized to identify Real-Time Application (RTA) traffic, and traffic identified with an RTA TID does not carry non-RTA traffic.

2. Embodiments

2.1. Communication Station (STA and MLD) Hardware

FIG. 1 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

Figure 2:
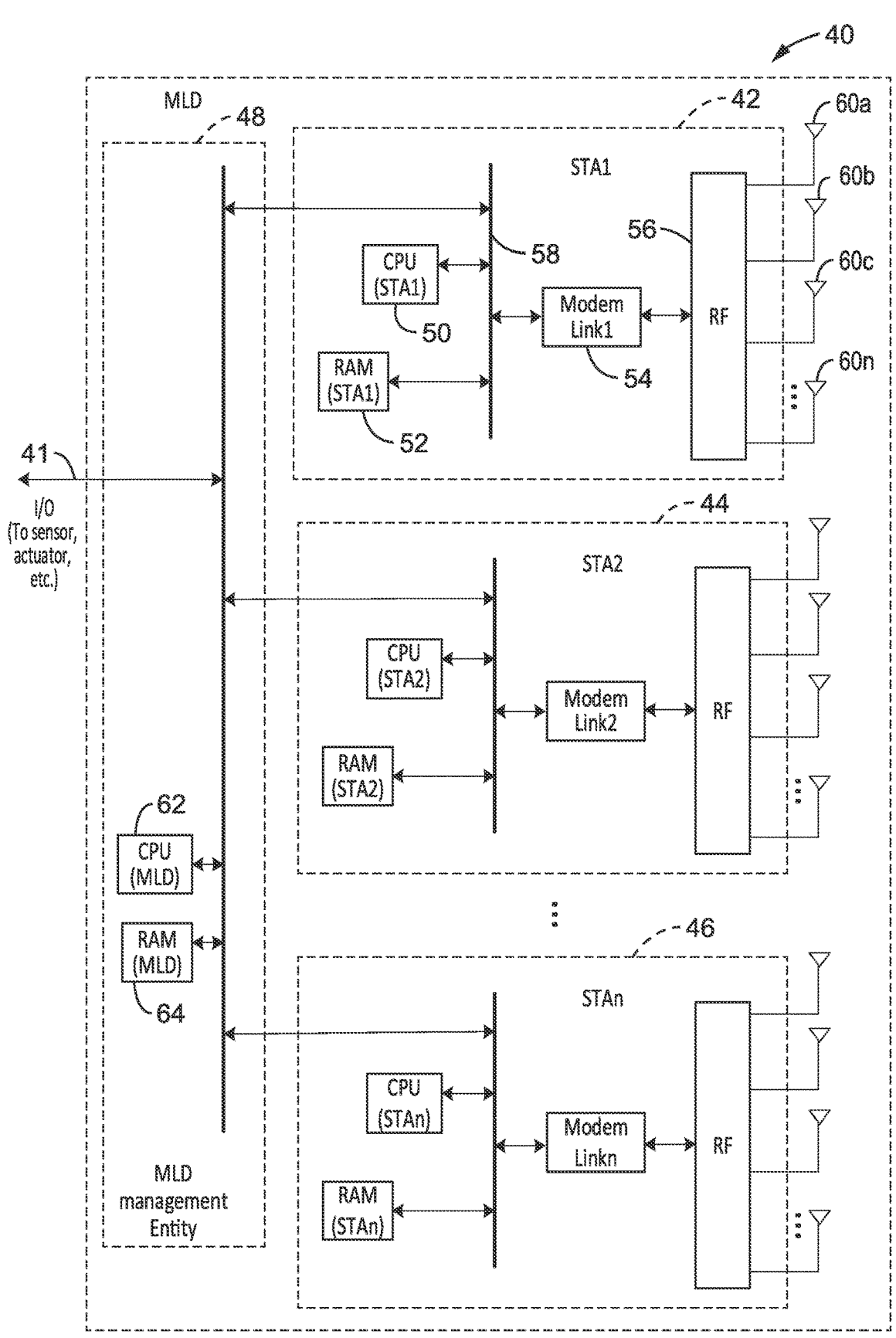
FIG. 2 is a block diagram of Multi-Link Device (MLD) hardware according to at least one embodiment of the present disclosure.

FIG. 2 illustrates an example embodiment 40 of a Multi-Link Device (MLD) hardware configuration. Soft AP MLD is a MLD that consists of one or more affiliated STAs, which are operated as APs. A soft AP MLD should support multiple radio operations on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

3. Use of Long Packets and Quick Ack on Secondary Link

3.1. Indication of ACK Timing/ACK Link in Long Packet

Figures 3, 4:
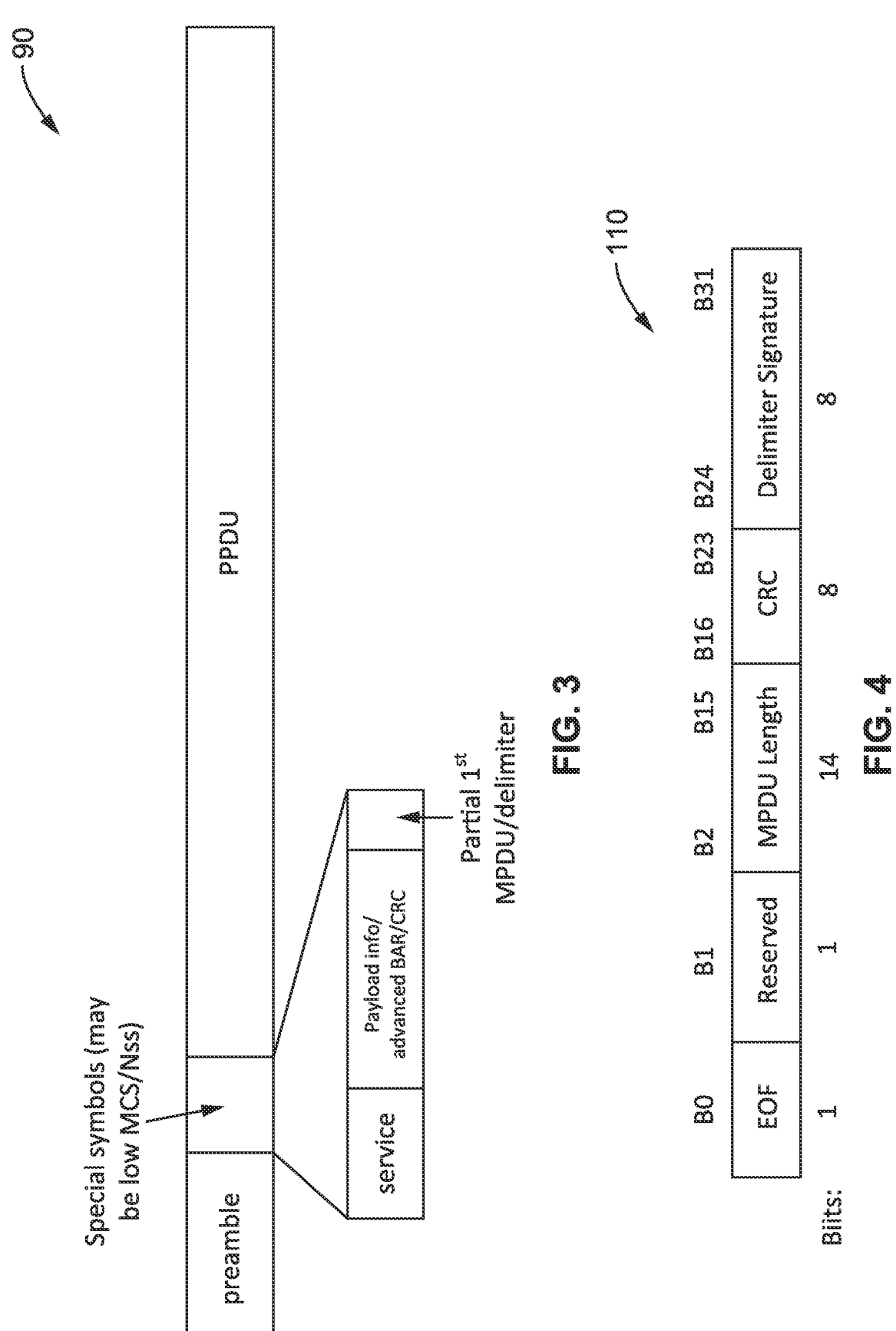
FIG. 3 is a communications diagram of a PPDU showing its use of quick Ack timing, or quick Ack link timing, in a long packet communication, according to at least one embodiment of the present disclosure.
FIG. 4 is a data field diagram of using a reserved bit in an MPDU delimiter (non-OMG) for indicating that the next quick Ack opportunity, according to at least one embodiment of the present disclosure.

FIG. 3 illustrates an example embodiment 90 of conveying Ack timing or Ack link in a long packet communication. The figure depicts a long packet with preamble, followed by an area for special symbols, exemplified as a service field and payload information or Block Ack Request (BAR) for a quick Ack (Advanced BAR) or check such as Cyclic Redundancy Check (CRC).

The following describes payload information or advanced BAR, which may be conveyed to a recipient. such as in a long packet. (a) One or more time indicators (e.g., symbol numbers) to the receiver indicating at which time it may perform an Ack on another link before the completion of the PPDU. For example, the symbol indicated may be the last symbol that carries RTA MPDUs. (b) The link ID suggested, or not suggested, for the Ack may also be provided, such as to recommend to transmit or not to transmit on a link that is currently Clear Channel Assessment (CCA) busy on the originator side should not be a link to recommend for sending an Ack. (c) The payload information may be the MCS/Nss of the retransmitted MPDUs. (d) The payload may incorporate TIDs that need to be reported in a quick Ack, number of octets of the TID before the requested Ack time (including delimiters). The above information may also be preconfigured, such that the above information does not need to be explicitly indicated in the packet, but represented by a pre-configuration identifier. As an alternative to FIG. 3, the above information may be implicitly indicated in the preamble of the long PPDU by using a Preamble field to signal a pre-configuration identification. As another alternative, ADD Block Ack (ADDBA) request and response exchanges can be used to signal the preconfiguration.

As shown in FIG. 3, the above information may be provided in the symbols following the preamble, denoted as special symbols, with the following examples. (a) Some of the above information is carried in some of the bits in the SERVICE field (e.g., the remaining five bits of the SERVICE field before scrambling), and remaining information bits carried in the remainder of the special symbols. (b) Special symbols may have a preconfigured lower MCS with a single Spatial Stream (SS). For example, using the lower Modulation Coding Scheme (MCS) provides more protection to the information above than using the MPDUs that follow. SERVICE currently does not have a Cyclic Redundancy Check (CRC), and thus a CRC may be added for the SERVICE and the following bits used to indicate the above information. The SERVICE and information above may be contained in a Low Density Parity Check (LDPC) Code Word (CW) with a different CW length than the remainder of the PPDUs. The number of the special symbols, or the MCS, of the special symbols and CW configuration may be indicated in the preamble or be pre-configured. If a single Spatial Stream (SS) is used to transmit special symbols, the channel may be the sum of the estimated multi-stream channels based on multi-stream Training fields in the Extra-High-Throughput (EHT) preamble from all SS.

3.2. Indication of the Presence of RTA MPDUs in Ongoing AMPDU

The previous section described the originator recognizing (knowing) that there are no RTA MPDUs in an AMPDU before it is transmitted, which thus assumes then that there is no need to send a quick Ack if all MPDUs are latency tolerant. So, it may be necessary to communicate to the recipient the presence of inserted RTA MPDUs in an ongoing AMPDU. For example, the recipient may not recognize that there are RTA MPDUs in the AMPDU because the received RTA MPDUs are in error.

This may be addressed in a number of ways. (a) A special Short Training Field (STF) may be received indicating the start and end of inserted RTA MPDUs/symbols. (b) A field in the MPDU delimiter may indicate the presence of inserted RTA MPDUs prior to the delimiter. For either case (a) or (b), the timing and/or periodicity and/or channel of quick Ack may be preconfigured. By detecting (a) or (b), the recipient may perform a quick Ack on the next preconfigured opportunity.

FIG. 4 illustrates an example embodiment 110 of using the Reserved bit in an MPDU delimiter (non-OMG) being set to first state (e.g., 1) to indicate that at the next quick Ack opportunity, a quick Ack needs to be performed (if there are MPDUs in error); otherwise, the quick Ack may be skipped even if all MPDUs are received (e.g., including low priority MPDUs). Setting this Reserved bit to a first state (e.g., "1") indicates there is an RTA MPDU located before the delimiter and the originator does not have receiver quick Acks for those RTA MPDUs. The originator only needs to change some delimiters (not all) after RTA MPDUs to trigger a quick Ack.

3.3. Long Packet from the Originator

3.3.1. Quick Ack on L2 Using EDCA-Explicit Confirmation w/reTx on L1

The following describes a quick Ack on Link2 (L2) using EDCA-Explicit confirmation with retransmission on Link1 (L1).

Figures 5, 6:
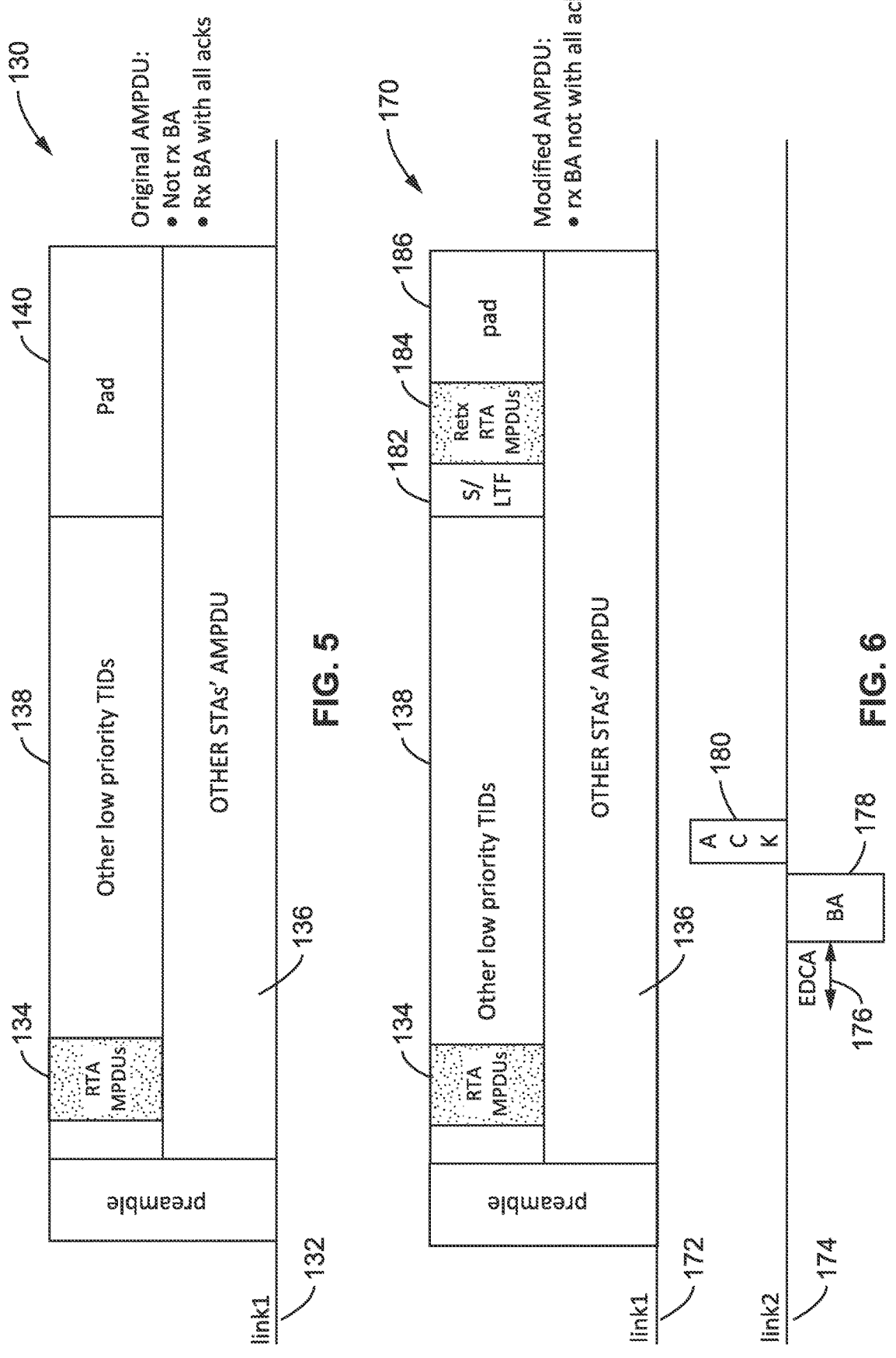
FIG. 5 is a communications diagram of an original AMPDU for link1, without a quick Ack.
FIG. 6 is a communications diagram of EDCA explicit confirmation on L2 and retransmission on L1, according to at least one embodiment of the present disclosure.

FIG. 5 illustrates an example 130 of an original AMPDU for link1 132, shown with RTA MPDUs 134, other STAs AMPDU 136, other lower priority Traffic Identifiers (TIDS) 138 and padding 140.

FIG. 6 illustrates an example embodiment 170, which improves the example FIG. 5 130 of an EDCA explicit confirmation using a retransmission on L2. Communications are shown in Link1 172 and Link2 174. Similar to FIG. 5 is seen RTA MPDUs 134, other STAs AMPDU 136, and other low priority TIDs 138.

In this example of FIG. 6 170 the recipient MLD may send a quick Ack on Link2 using EDCA 176 by performing CSMA/CA that requires an ack to quick Ack for detecting collision. Since there is a possibility of collision and BA 178 starts TXOP, the recipient MLD may require a confirmation, similar to a deprecated legacy 802.11, procedure shown in FIG. 7, in which a delayed BA uses Ack 180 responding to BA 178. It should be noted the BA 178 may contain MCS/Nss feedback.

The originator may Ack the BA on L2 explicitly. The originator has the freedom to place the retransmitted data anywhere in the long packet, such as replacing the original padding, or replacing the lower priority MPDUs. The recipient discontinues (stops) retrying the BA after receiving an Ack.

In addition, the example of FIG. 6 depicts replacing a portion of the padding with a retransmission of the RTA MPDU. Specifically, the beginning of the padding is shown replaced with a short or long training field (S/LTF) 182 followed by retransmission 184 of RTA MPDUs, followed by whatever padding is still required 186.

Figure 7:
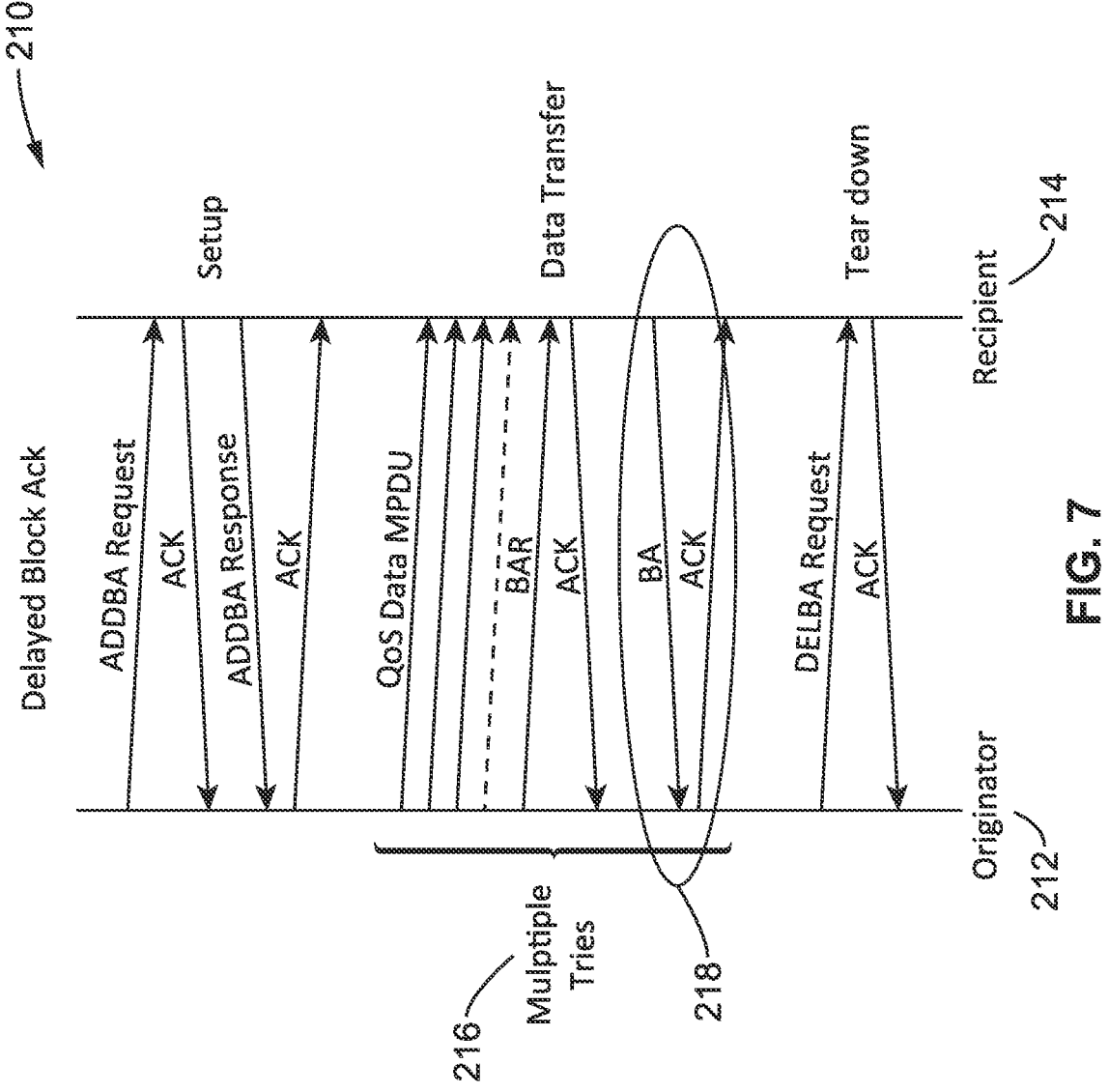
FIG. 7 is a communications sequence diagram of multiple Ack attempts during a delayed block Ack between originator and recipient STAs, according to at least one embodiment of the present disclosure.

FIG. 7 illustrates an example embodiment 210 of multiple Ack attempts 216 in a delayed block Ack between Originator 212 and Recipient 214 STAs. Setup is shown with ADDBA requests/responses and Acks, followed by MPDUs and then a BAR from the Originator and an Ack back from the Recipient. After this the Recipient sends a BA, and receives an Ack which then completes 218 the process. After which a tear down (DELBA) is seen with associated ACK.

3.3.2. Quick Ack on L2 w/EDCA-Implicit Confirmation and reTx on L1

The following describes a quick Ack on Link2 (L2) with as EDCA-implicit Confirmation and retransmission on Link 1 (L1).

Figure 8:
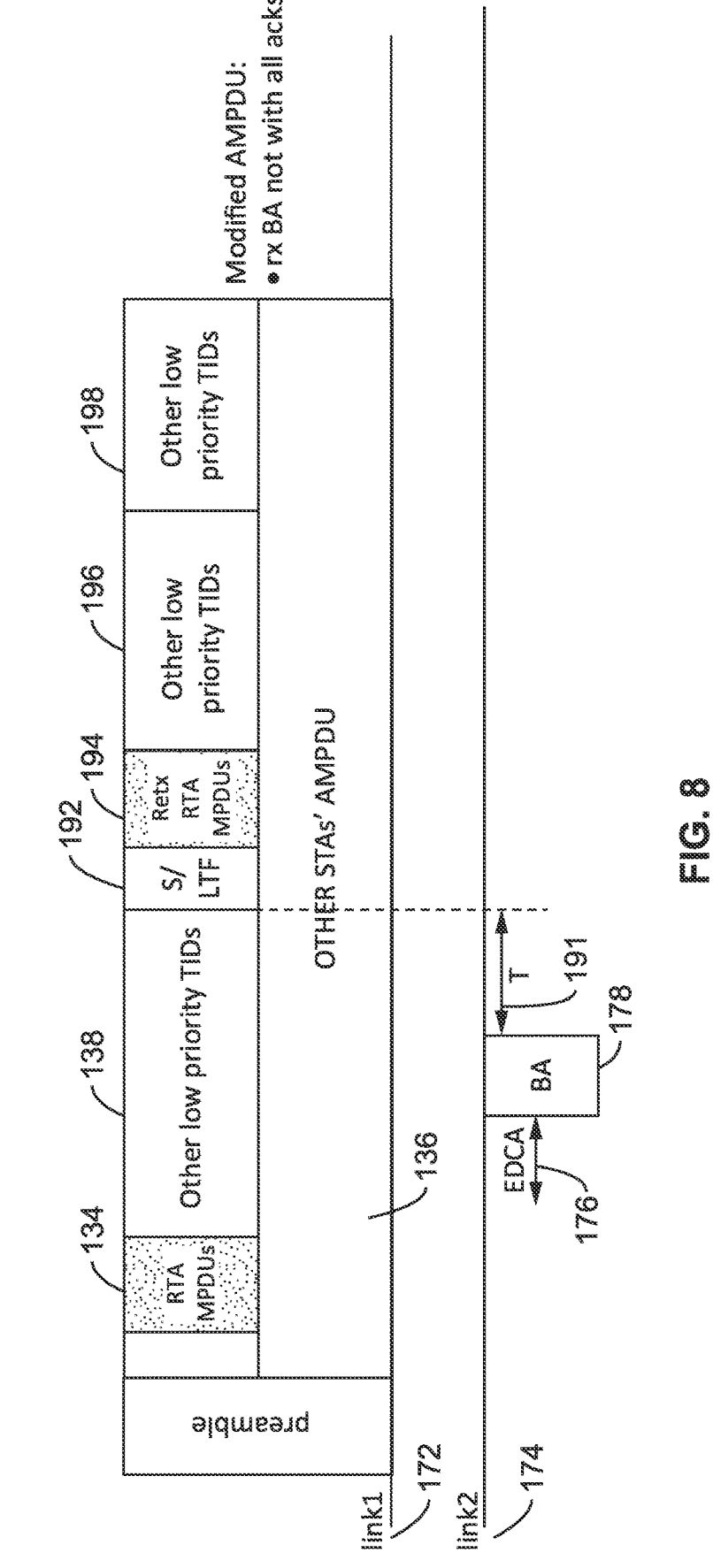
FIG. 8 is a communications diagram of an implicit confirmation and retransmission, according to at least one embodiment of the present disclosure.

FIG. 8 illustrates an example embodiment 190 of an implicit confirmation and retransmission. The confirmation of a quick Ack sent on L2 may be implicit by observing the retransmitted MPDUs on L1. As in the prior figure, one sees communications on Link1 172 and Link2 174, and depicts RTA MPDUs 134, others STAs AMPDU 136, and other low priority TIDs 138.

As in the prior figure EDCA 176 is seen with a BA 178, but in this case, this is followed by a period "T" 191. "T" is a predefined value with margin of error of 1 OFDM symbols. The actual retransmission start may be the first symbol on L1 after period T, which by way of example and not limitation is preconfigured in this case. In the retransmission, an S/LTF is shown 192, followed by RTA MPDU retransmissions 194, and multiple other low priority TIDs 196 and 198.

Retransmission may be performed, in a separate PPDU if after time period T there is insufficient time to retransmit on the same PPDU.

3.3.3. L2 Quick Ack w/EDCA-Implicit/Explicit Confirm. w/reTx on L1

The following describes a Link2 (L2) quick Ack being performed with EDCA-implicit or explicit confirmation in a retransmission on Link1 (L1).

A modified Short Training Field (STF) may signal the start of retransmission (reTx), LTF may follow for the recipient to re-estimate the channel. Repetition within the STF, for example missing tones, indicate that this is not a data symbol. The STF may be modified to be the same length as a Data OFDM symbol.

The MCS/Nss of retransmitted MPDUs may be indicated in a BA (determined by recipient), or indicated in the special symbols (determined by originator).

An Ack frame may not be used for quick ack if sent in a non-HT format. There is no TA information.

The recipient may retry BA if it does not detect the start of retransmission or Ack to BA.

The amount or duration of retransmitted data may be derived by the recipient. For example, this may be determined based on the number of symbols soliciting Ack, MCS/Nss, and Ack'ed MPDU bytes (and associated delimiter). If the originator signals the number of octets for a TID before Ack time, retransmission MCS/Nss, then the recipient can derive the symbols needed to retransmission of the TID.

The recipient may need to cache unfinished LDPC CW interrupted by retransmission.

If different $MCS_{new}/Nss_{new}$ is used for retransmission, then the following is applicable. The retransmission itself may be an AMPDU (possibly without SERVICE). Because the recipient recognizes (knows) the $MCS_{old}$ and $Nss_{old}$ of retransmitted Data and the number of bytes, it can derive the symbol when retransmission ends. MCS/Nss in the following symbols may be reverted to the $MCS_{old}$ and $Nss_{old}$. When resuming new Data (lower priority ones), if reverted to $Nss_{old}$, then: LTF symbols may follow; or Data symbols may follow.

The recipient is assumed to have cached the original channel estimation for the $Nss_{old}$ spatial streams.

The last symbol used to carry retransmitted data may contain part of the new Data (or its delimiter) that follows.

3.3.4 L2 Quick Ack w/EDCA-Implicit/Explicit Confirm. w/rxTx on L2

The following describes a Link2 (L2) quick Ack with EDCA-implicit or explicit confirmation in a retransmission on Link2 (L2).

This section describes an alternative in which retransmission is performed on L2. The behavior of retransmissions on L1 or L2 is in the preamble, or is preconfigured, or signaled in the special symbols. In this case retransmission data is sent on L2 responding to the quick Ack in the same TXOP. Following are examples for performing retransmissions on the alternate link.

Figure 9:
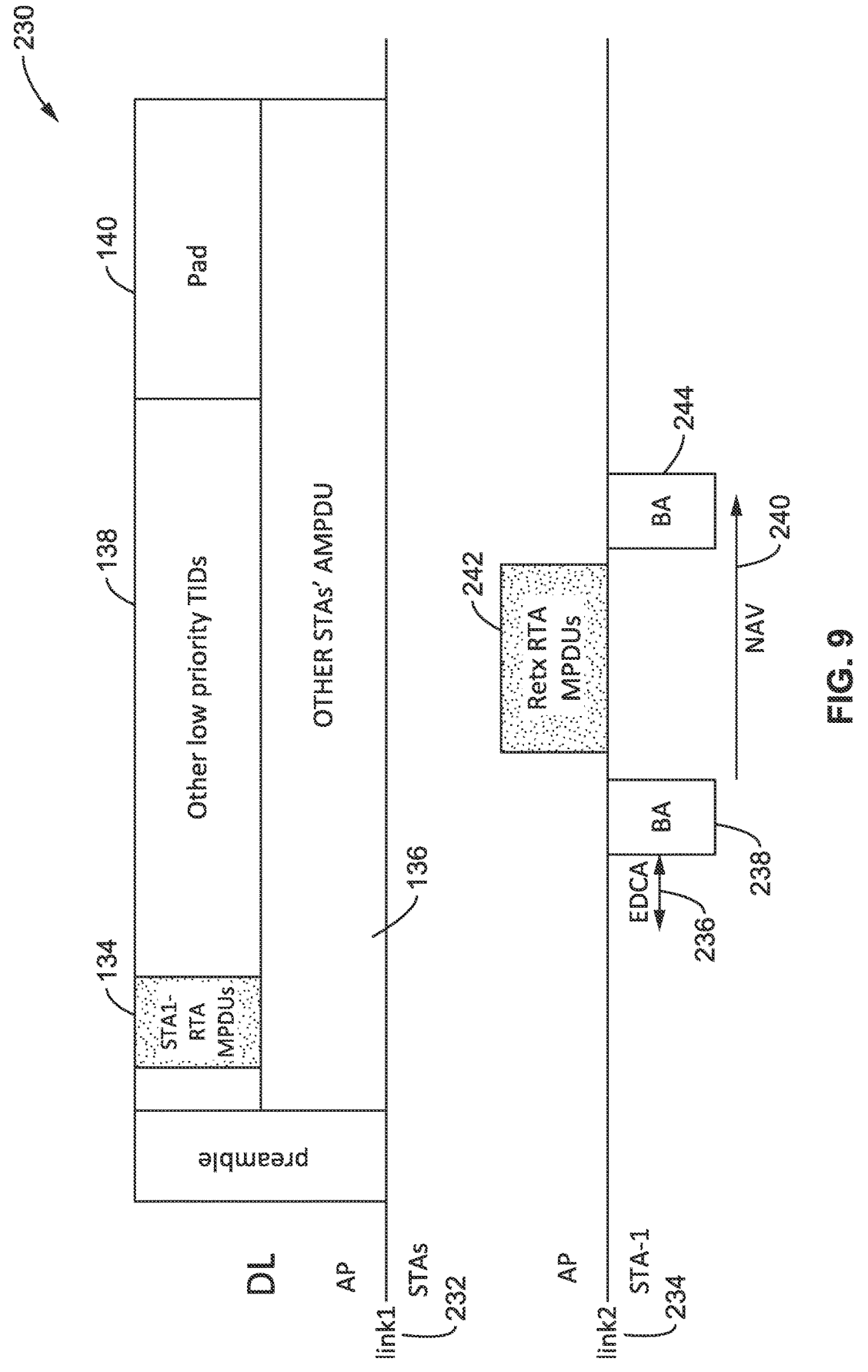
FIG. 9 is a communications diagram of a Down Link (DL) retransmission on the alternate link, according to at least one embodiment of the present disclosure.

FIG. 9 illustrates an example embodiment 230 of a DownLink (DL) retransmission on the alternate link. The upper portion of the figure depicts the same basic transmission on Link1 232 as was shown in FIG. 5, with RTA MPDUs 134, other STAs AMPDU 136, other lower priority Traffic 138 and padding 140.

However, the retransmission operation in this example is performed on Link2 234. An EDCA 236 is followed by BA 238 from STA1, and NAV is set 240, during which time the AP retransmits RTA MPDUs 242, to which STA1 responds with BA 244.

Figure 10:
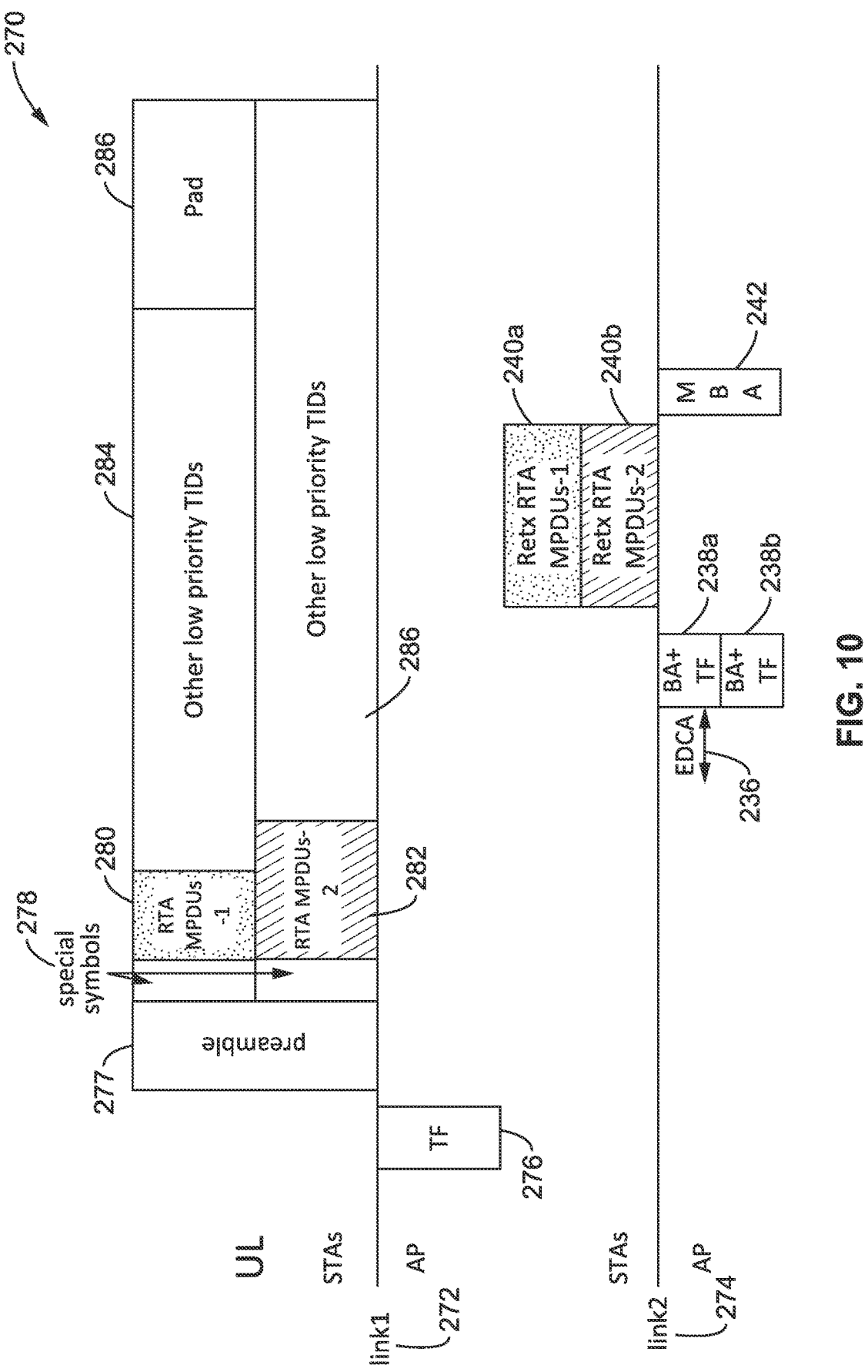
FIG. 10 is a communications diagram of quick Ack timing for UpLink (UL) data, according to at least one embodiment of the present disclosure.

It should be noted that the NAV of the BA (DL) of FIG. 9, or the UL length in TF (UL) in FIG. 10, may be determined using the method described in a previous section.

If the original PPDU solicits multiple quick Acks from the same recipient, the retransmission PPDU responding to the first quick Ack may be padded to protect the next quick Ack in the same TXOP. In this case, the BA or multi-STA BA (MBA) is used in response to the retransmitted data and second quick Ack may be merged into a single BA. The configuration may disallow such padding if there are other STAs which may perform quick Ack. The BA used to obtain the TXOP may also serve a similar purpose to a Reverse Direction Grant (RDG), such that the AP has control of the remainder of the TXOP to poll the second recipient STA.

FIG. 10 illustrates an example embodiment 270 of quick Ack timing for UpLink (UL) data. In the upper portion of the figure the AP sends a TF 276. The TF may indicate quick Ack timing for UL data as determined by the AP, or it may be indicated in special symbols as determined by STA.

Trigger 276 triggers UL transmissions from the STAs. The communication is shown with preamble 277 followed by special symbols 278, RTA MPDUs-1 280, and RTA MPDUs-2 282, which are followed by transmissions from other low priority TIDs 284 and 286, one of which is padded 286 by way of example.

The AP may aggregate quick Ack and UL retransmissions to and from different users in a single MU TXOP. This is shown with EDCA 236 with two BA+TF 238a, 238b, in response to which the STAs perform retransmissions of MPDUs-1 240a and MPDUs-2 240b, to which the AP responds with an MBA 242.

3.3.5. Originator Behavior w/o Rx Quick Ack if L2 Uses EDCA

If using EDCA on L2 for a quick Ack, then the quick Ack may be delayed because of Clear Channel Assessment (CCA) busy, and the recipient will retry the quick Ack if it is not receiving a confirmation of the quick Ack. The originator which is not receiving a quick Ack after the indicated symbol, may consider that either the quick Ack is lost but will be retransmitted, or that the quick Ack is delayed.

There seems no reason for the originator to retransmit the complete data before receiving the quick Ack, for example the originator may elect to take no action if it has not received the quick Ack. Based on the above originator behavior, the quick Ack may be a Negative Acknowledgement (NAK), or the recipient may not need to send a quick Ack if there is no missing data.

Alternatively, in certain cases the recipient needs to send a quick Ack even if there is no missing data. In this case the originator can clear the retransmission buffer after getting the quick Ack. L1 still requires a BA after AMPDU. The NAK behavior above may not apply for a delimiter based Ack request because the delimiter itself may be in error and not recognized by the recipient.

4. Long Packet Transmissions from the Recipient

4.1. Shared Ack Resource Unit (RU)—Example 1

In this section is discussed a Recipient transmitting a long PPDU. If the recipient is an AP, it may allocate a shared Ack RU for performing a quick Ack. The shared Ack RU, for example may be a broadcast RU.

The MPDUs in an AMPDU may be acknowledged before the end of the AMPDU. For example, the Ack status can be returned in symbol n for the finished MPDUs in symbol n-d.

A shared Ack RU on L2 can stream the Ack status of received data d symbols earlier on L1, such as for example: (a) inserting a Least Significant Bit (LSB) of a Sequence Number (SN) followed by a number of continuously received MPDUs after the SN; or (b) insert a CRC every several symbols, or (c) the RU may be special in that it only contains several tones.

The shared Ack RU may also be used to indicate a NAV of another link NAV (e.g., L1 NAV) when not performing quick Acking. L1 NAV may also contain the ID of the TXOP holder on L1. The L1 NAV is the NAV duration of L is ongoing PPDU's remaining duration+NAV of the PPDU.

Figure 11:
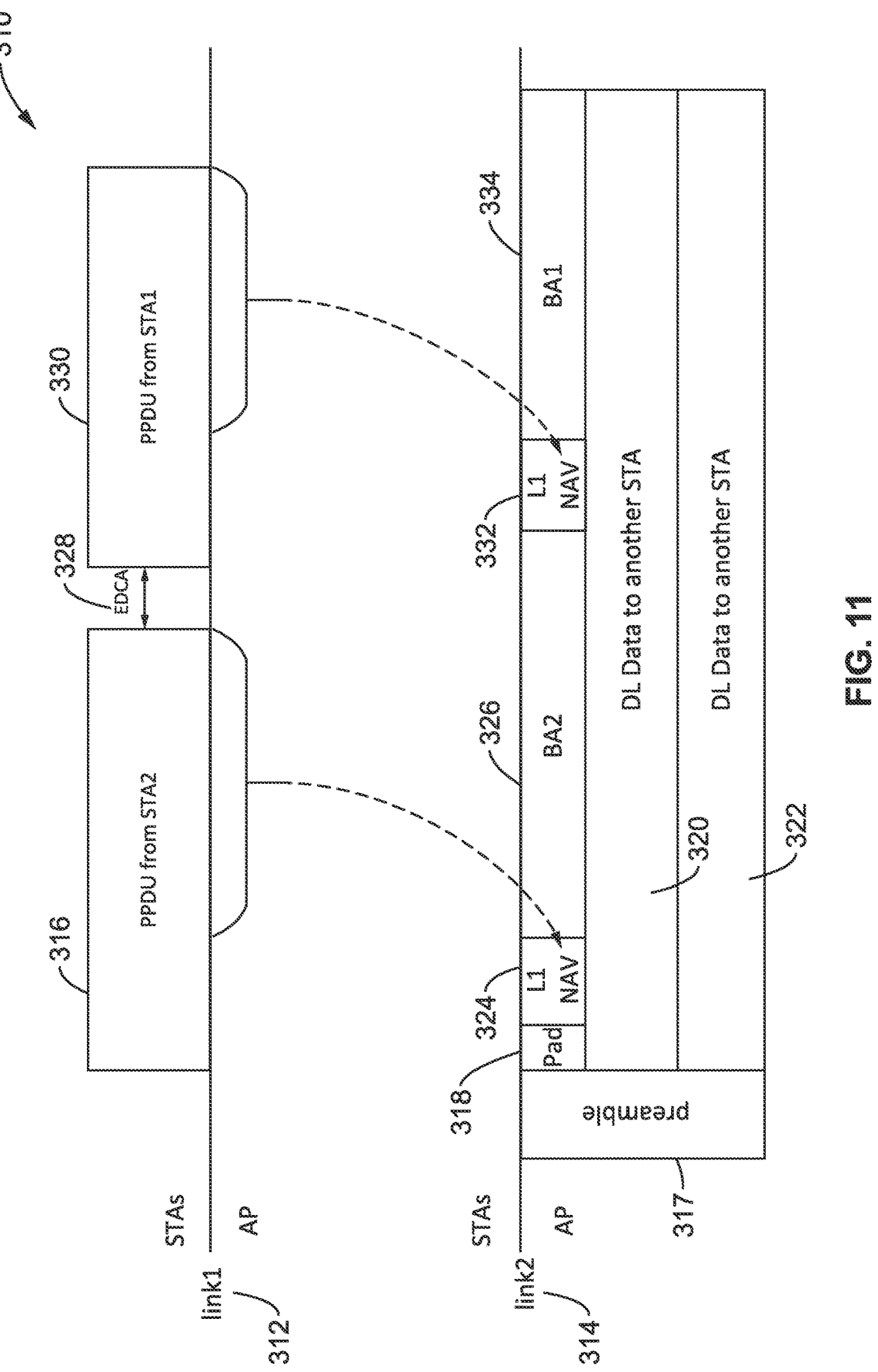
FIG. 11 is a communications diagram of a shared Ack Resource Unit (RU), according to at least one embodiment of the present disclosure.

FIG. 11 illustrates an example embodiment 310 of a shared Ack RU, with communications between STAs and its AP are shown over Link 1 (L1) 312 and Link 2 (L2) 314.

As shown in the figure a shared Ack RU on L2 (the RU that carries 318, 324, 326, 332, and 334) can stream the Ack status of received data symbols earlier on L1, such as for example: (a) inserting a Least Significant Bits (LSBs) of a Sequence Number (SN) followed by a number of continuously received MPDUs after the SN; and/or (b) insert a CRC every several symbols, and/or (c) the RU may be special in that it only contains several tones.

In FIG. 11, the shared Ack RU (the RU that carries 318, 324, 326, 332 and 334) may also be used to indicate a NAV of another link NAV (e.g., L1 NAV) when not performing quick Acking. L1 NAV may also contain the ID of the TXOP holder on L1. The L1 NAV is the NAV duration of L1s ongoing PPDU's remaining duration+NAV of the PPDU.

The AP is shown with a DL transmission having preamble 317 and RUs directed to different STAs. In particular, there is DL Data being sent 320 and 322 to different STAs, while one RU is shown being used for Acks and NAVs. In this example, STA1 and STA2 on L1 are hidden nodes and STA2 starts TXOP first on L1 with PPDU 316. It will be noted that in PPDU 316 STA1 does not receive STA2 (STA2 could be OBSS STA, in in this case no BA2); STA1 MSDU arrival and BO counter counts down to zero; however, STA1 defers channel access because it recognizes the L1 NAV from L2 shared Ack RU. The TXOP started on L1 within the duration of the shared RU does not require RTS/CTS for hidden node detection. Padding 318 is shown following preamble 317, after which is seen L1 NAV 324. The AP sends BA2 326 to STA2.

STA 1 observes the shared Ack RU and recognizes how long it is to defer on L1, while STA2 (as originator) receives quick Ack 326 for its PPDU and may perform a retransmission (reTx) within the same PPDU, or retransmission in a new PPDU. A delay of an EDCA-based channel access 328 is seen before PPDU 330 from STA1, with L1 NAV 332 seen in an RU in the TXOP on L2. The AP responds with BA1 334 to STA1, and STA1 may also perform retransmission if there is sufficient time remaining.

4.2. Shared Ack Resource Unit (Ru)—Example 2

The shared Ack RU also aids with collision detection so the collided party can terminate immediately and retry.

Figure 12:
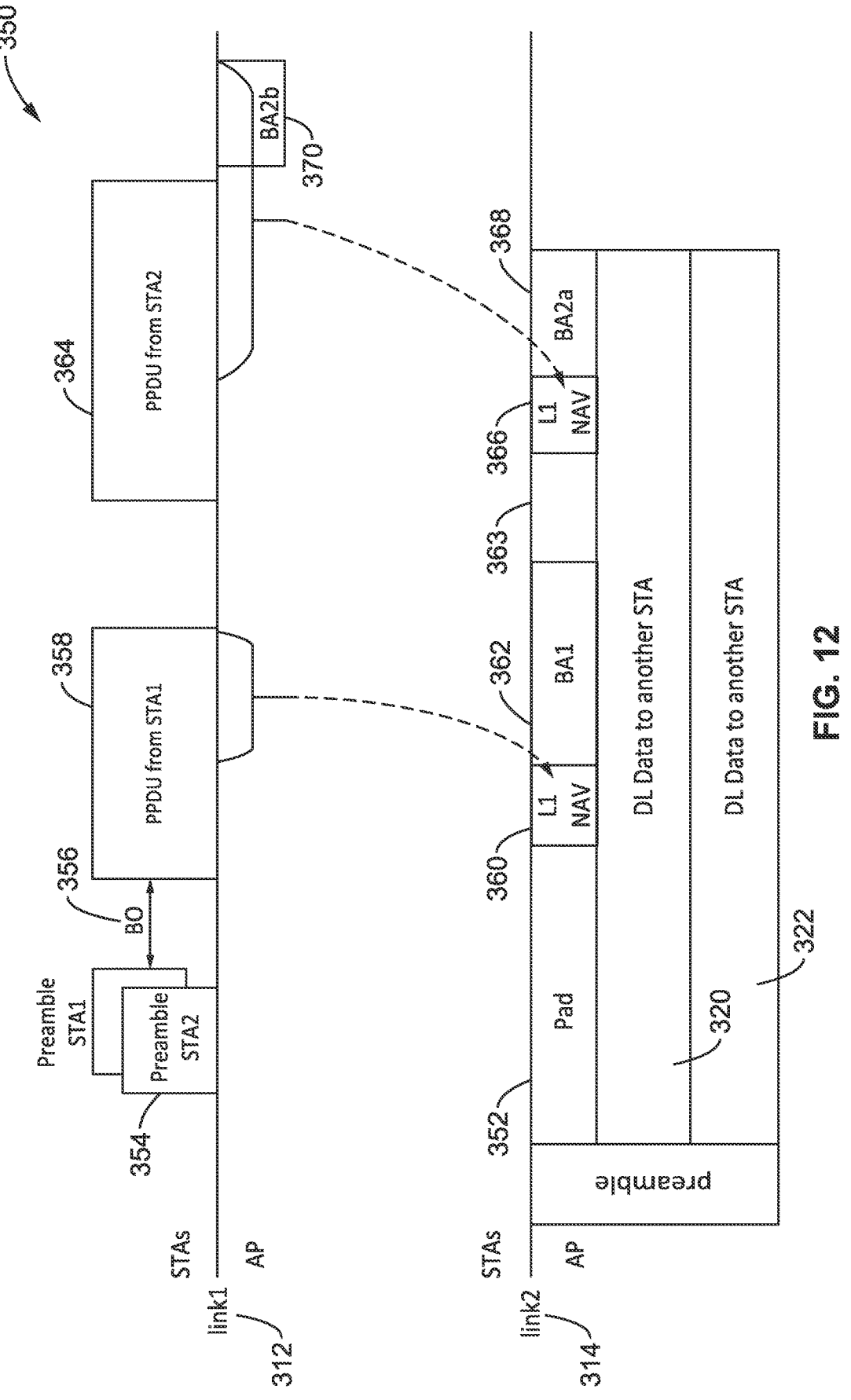
FIG. 12 is a communications diagram of a second shared Ack RU, according to at least one embodiment of the present disclosure.

FIG. 12 illustrates an example embodiment 350 of a second shared Ack RU, showing communications between STAs and the AP over Link 1 (L1) 312 and Link 2 (L2) 314. In this example, the lack of L1 NAV on the shared RU on L2 indicates a collision after STA1 or STA2 transmission; whereby both of these STAs back off.

In particular, there is DL Data being sent 320 and 322 to different STAs on L2, while one RU is shown being used for Acks and NAVs. In this example, a collision takes place 354 between STA1 and STA2 on Link 1, while the RU for the Acks on L2 has padding 352, not indicating reception from either. STA1 and STA2 detect collision because the L1 NAV on L2 is missing, thus STA1 and STA2 have an early termination of the transmission and start a BO.

A Back-Off (BO) 356 is performed after which STA1 obtains the TXOP and transmits PPDU 358 to the AP on L1, with the RU showing an L1 NAV 360 on L2. The AP responds to receipt with BA1 362, followed by more padding 363, as necessary.

STA2 gets the TXOP on L1 after STA1 and sends PPDU 364, with its L1 NAV 366 in the RU on L2. The AP sends from L2 RU a first portion of a BA as BA2a 368, because the PPDU from STA2 extends beyond the duration of shared Ack RU. Therefore, the first part of MPDUs are Ack'ed by shared Ack RU (BA2a) 368, and the remainder (or all MPDUs) are Ack'ed by the regular BA (BA2b) 370 on L1.

4.3. UL Zone for Increased Access Opportunities

Because of a shared Ack RU on L2 for the transmission on L1, the AP may create a UL zone on L1 that aligns with the long PPDU/TXOP on L2. In this UL zone the AP is only receiving, and UL access opportunities are increased by accessing L1 secondary channels without the need of considering alignment with PPDUs on other channels.

Figure 13:
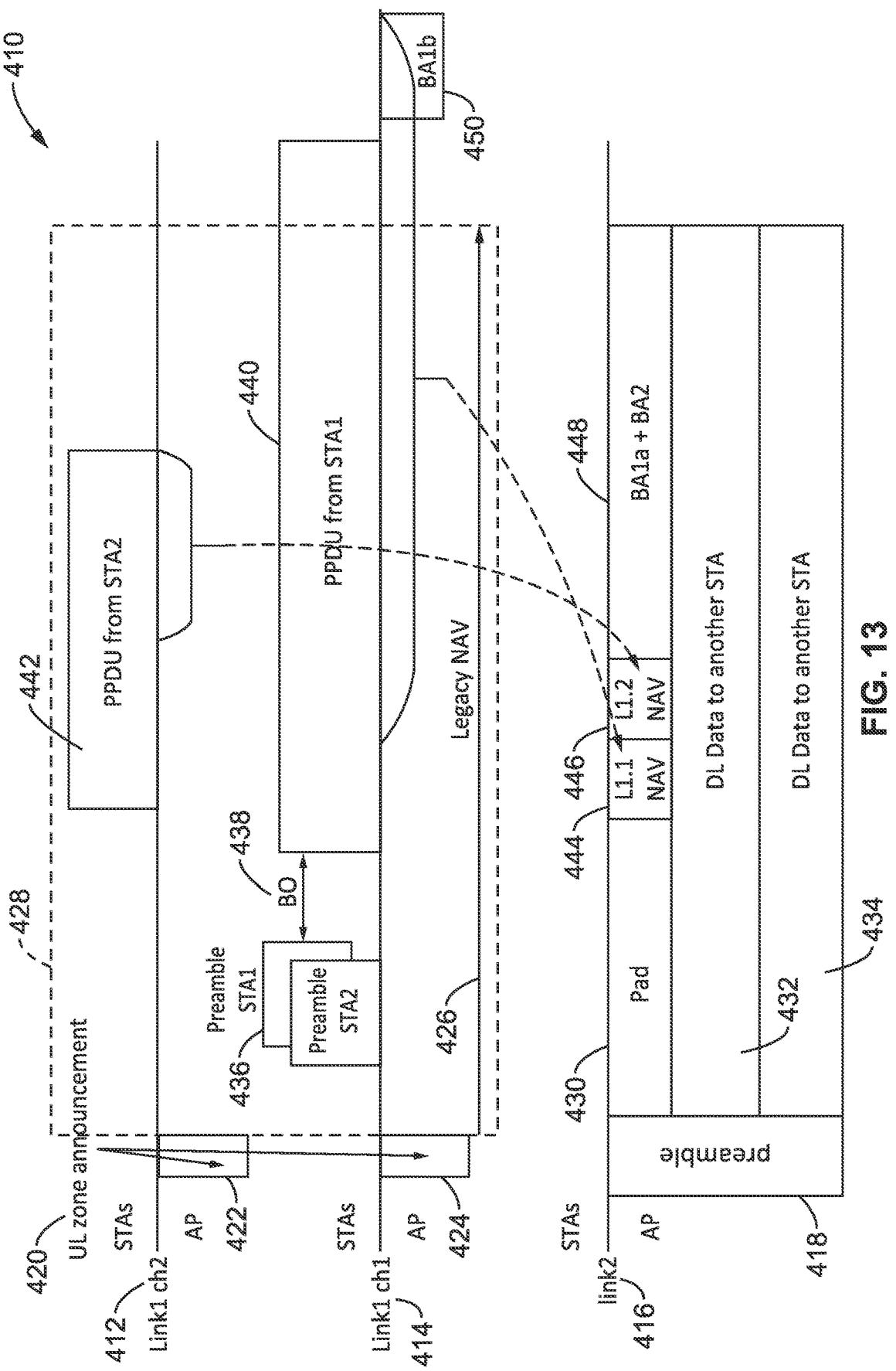
FIG. 13 is a communications diagram of a UL zone to increase access opportunities, according to at least one embodiment of the present disclosure.

FIG. 13 illustrates an example embodiment 410 of a UL zone to increase access opportunities. The figure depicts communications between STAs and the AP over Link1 for ch2 (L1.2) 412 and for Link1 ch1 (L1.1) 414, and for Link 2 (L2) 416.

The AP on L1 issues a UL zone announcement 420, as seen on ch2 422 and ch1 424, which covers zone 428 on L1 and has legacy NAV 426. On L2 is a DL transmission having preamble 418 and DLs being performed on multiple RUs 432 and 434, with another RU containing Ack and NAVs for L1.

In this example, STA1 and STA2 on L1 experience a collision 436 of their preamble, as in the previous figure. Thus, the AP does not carry the L1.1 NAV on L2, instead AP Pads 430 using the shared ack RU. STA1 and STA2 detect collision on L1.1 because of the missed L1.1 NAV on L2. In this case, STA1 and STA2 give up transmission and start a BO. After the BO, STA1 obtains the TXOP on Link1 primary ch (L1.1) for PPDU 440; and this may block STA2 access on L1. On L2 are seen an L1.1 NAV 444 following padding 430 which may also block STA2 access on L1 ch1.

The AP has created UL zone 428 on L1 that is aligned with the long L2 DL PPDU. The UL zone announcement frame sets the NAV 426 for legacy STAs on L1 to prevent them from accessing L1. EHT STAs that recognize the UL zone announcement frame do not have to set NAV and may still be able to perform the access, and may perform parallel access on L1 ch2.

STA2 uses secondary channel (L1.2) on L1 to perform EDCA access because the primary channel is occupied, with an L1.2 NAV 446 shown in the shared Ack RU on L2. No NAV sync (synchronization) delay is needed because the UL zone announcement sets the NAV on L1.2. STA1 and STA2 may be hidden nodes and STA2 uses L1.1 NAV broadcasted on shared Ack RU on L2 to determine (know) if the primary channel is busy. The shared Ack RU streams a quick Ack 448 from the AP for both L1.2 and a first portion of L1.1. As in this example, the UL PPDU on primary ch (L1.1) extends beyond the UL zone 428 while UL PPDU 440 is being transmitted on the secondary channel (L1.2), the shared Ack RUs end and the last portion of the Ack (BA1b) 450 for the last portion of PPDU 440 is shown being transmitted on L1.1.

5. Long Packets Transmitted from Both Sides

5.1. Example of a UL Heavy L1+DL Heavy L2

Figure 14:
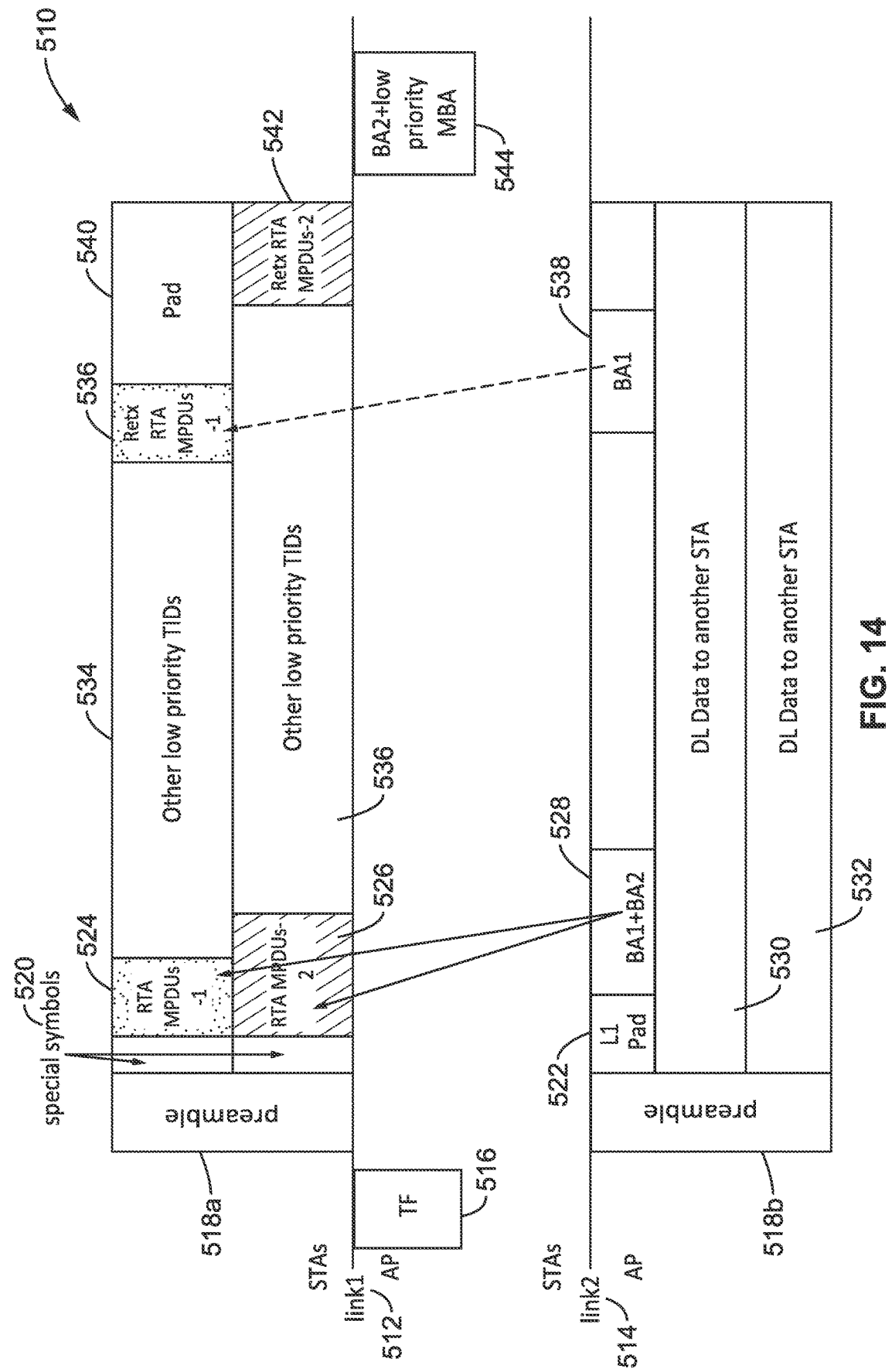
FIG. 14 is a communications diagram of UL heavy L1+DL heavy L2, according to at least one embodiment of the present disclosure.

FIG. 14 illustrates an example embodiment 510 of UL heavy L1+DL heavy L2. The example shows both links having long PPDUs. The shared Ack RU on L2 is shown providing quick Ack and hidden node protection for L1.

More particularly, the figure depicts communications between AP and STAs over Link 1 (L1) 512 and Link 2 (L2) 514. In this example the AP sends a TF 516 on L1 with STAs transmitting on L1, and the AP sending DL data and communicating quick Acks on an RU in the transmissions performed on L2.

The L1 transmission is shown with preamble 518*a*, followed by special symbols 520, and RTA MPDU-1 524, RTA MPDU-2 526, traffic from other low priority TIDs 534, 536, and retransmissions 536, 542, of both RTA MPDU-1 and RTA MPDU-2, along with padding 540 as necessary.

On L2 after preamble 518*b*, in the quick Ack RU on L2 is seen L1 padding 522, followed by the AP sending BA1+BA2 528 for the MPDUs 524, 526. Later the AP is shown sending a BA1 538 for the retransmission of RTA MPDU-1 536. Since the retransmission of RTA MPDU-2 occurs at the end of the TXOP, the Ack 544 for this is sent by the AP on L1 after the TXOP as a BA2+ low priority MBA.

5.2. Example of Ack RU in UL Direction

The shared Ack RU may be extended in UL direction. The AP on L2 may schedule multiple shared Ack RUs for multiple DL scheduled STA MLDs on L1 for quick Ack. AP on L2 may schedule one shared Ack RU for multiple DL scheduled STA MLDs on L1 for quick Ack using UL MU-MIMO; or for quick Ack using TDM.

Figure 15:
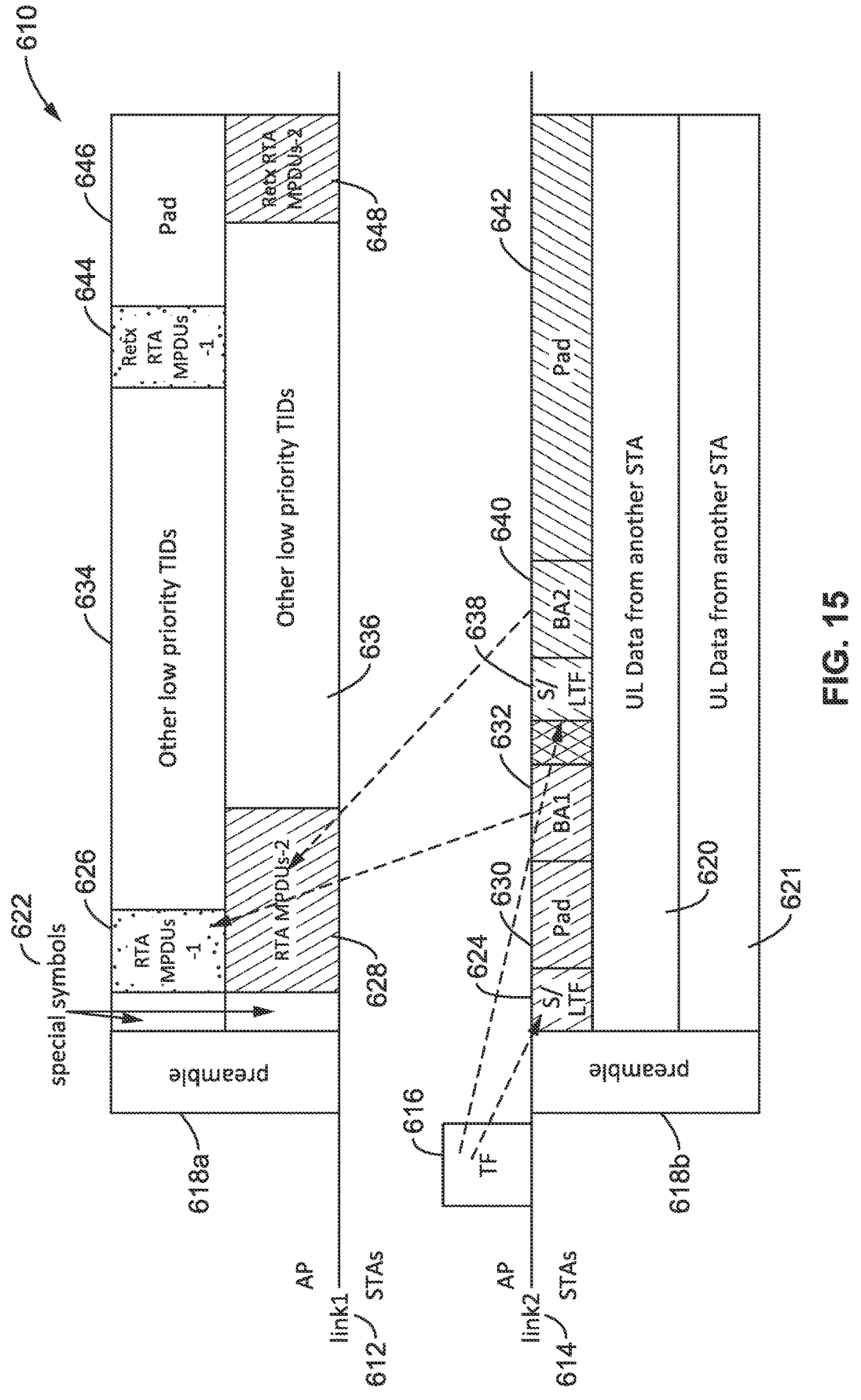
FIG. 15 is a communications diagram of AP scheduling of transmission start and/or end times on a shared Ack RUs using the Trigger Frame (TF) on L2, according to at least one embodiment of the present disclosure.

FIG. 15 illustrates an example embodiment 610 of the AP scheduling start and/or end times of transmission on shared Ack RUs using the TF on L2. Both MLD1 and MLD2 on L2 transmit Trigger-Based (TB)-PPDU preambles for protection in their network neighborhoods. MLD2 discontinues transmission after the preamble and resumes transmission of a S/LTF at the specified time. Resumed transmission from MLD2 uses power and frequency estimated from information obtained in the TF.

More particularly, the figure depicts communications between the AP and MLD1 and MLD2 over Link1 (L1) 612 and MLD1 and MLD2 and other STAs over Link 2 (L2) 614. In this example, the AP sends a TF 616 on L2. The STAs start transmitting on L2, the TXOP transmission which also contains a quick Ack RU, while the AP starts transmitting on L1.

The transmission on L1 is shown with preamble 618*a*, followed by special symbols 622 and RTA MPDU-1 626 to MLD1, RTA MPDU-2 628 to MLD2, there are also communications from other low priority TIDs 634, 636 to MLD1 and MLD2, respectively. There is also time in the TXOP for retransmissions 644, 648 of RTA MPDU-1 and RTA MPDU-2, and padding as necessary.

The transmission on L2 is shown with preamble 618*b*, followed by UL data 620, 621, and activity on the quick Ack RU showing S/LTFs 624, 638, determined from information sent in TF 616. In addition, the AP responds with BA1 632 to RTA MPDU-1, and with BA2 640 to RTA MPDU-2. Padding 630, 642 is also shown in this RU.

6. Process Flow Embodiments

Figure 16:
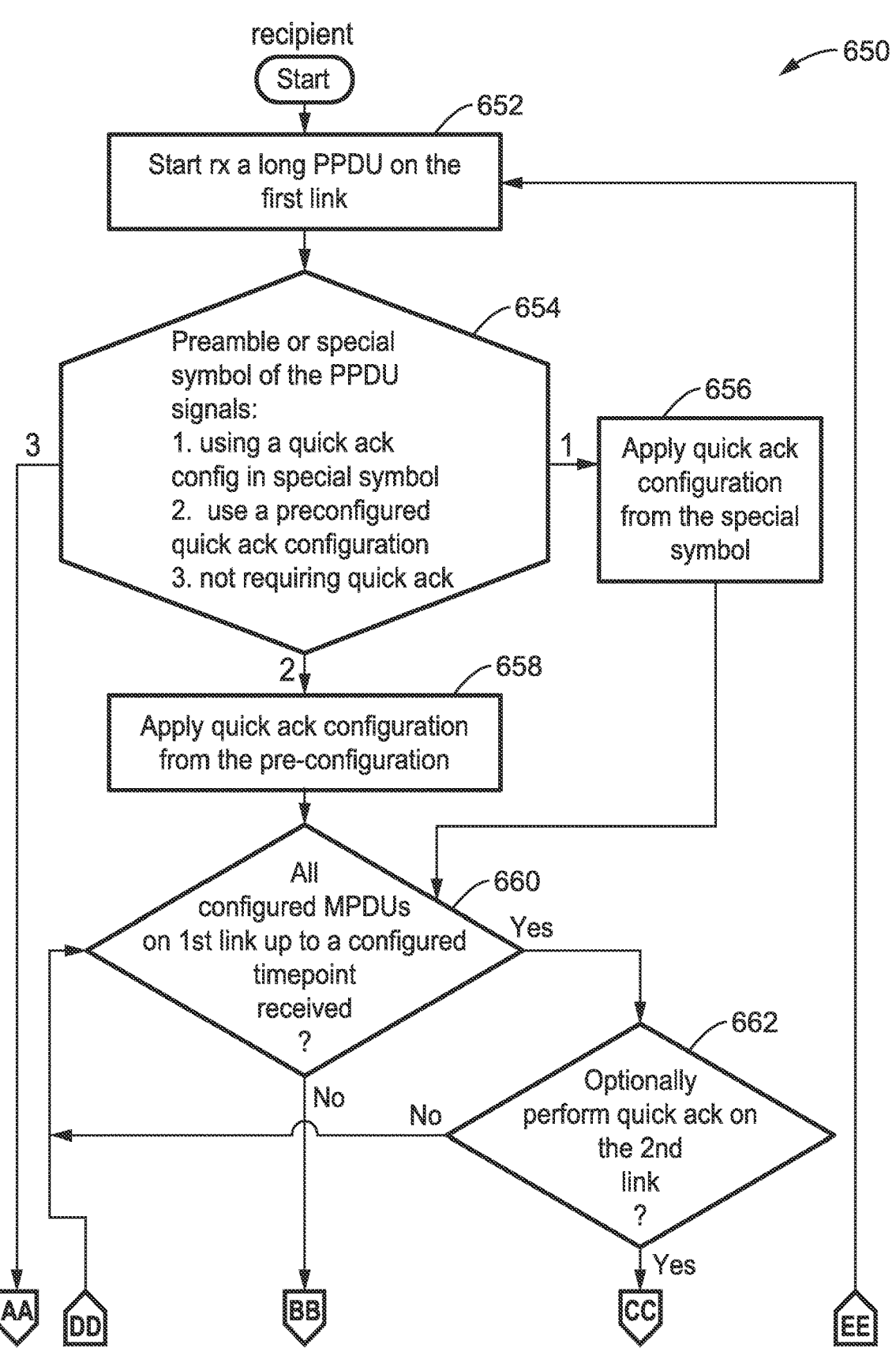
FIG. 16 and FIG. 17 is a flow diagram of recipient processing of a long PPDU requiring an Ack, according to at least one embodiment of the present disclosure.
Figure 17:
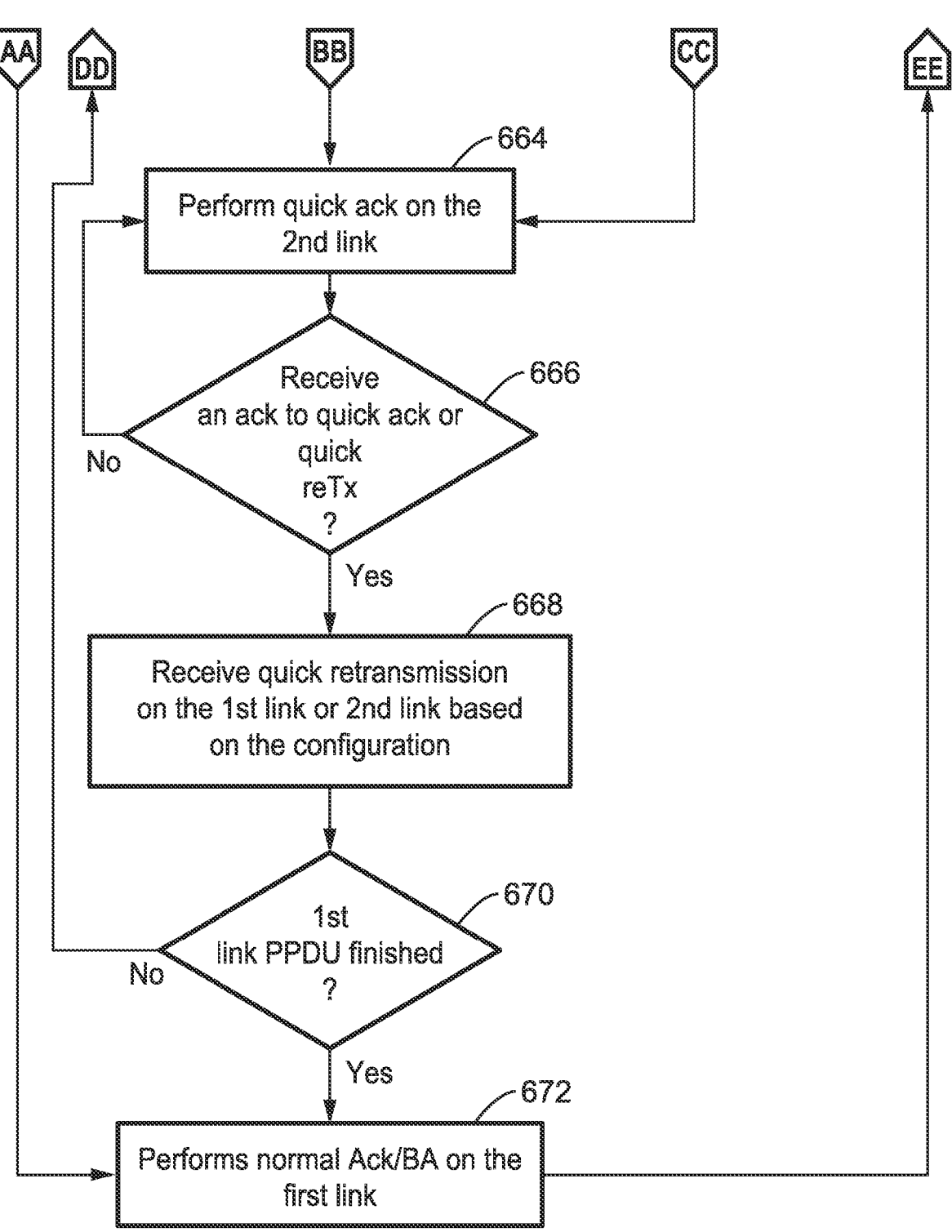

FIG. 16 and FIG. 17 illustrate an example embodiment 650 of recipient processing of a long PPDU requiring an Ack. On the first link an originator transmits a long PPDU requiring an Acknowledgement. On the second link the recipient transmits a quick Ack to the originator.

More specifically, in block 652 a receiver starts receiving a long PPDU on the first link. Check 654 determines which preamble or special symbol of the PPDU symbols from multiple choices: (1) using a quick Ack; (2) using a preconfigured quick Ack configuration; or (3) not requiring a quick Ack.

If the determination was choice (1) then at block 656 the recipient applies a quick Ack configuration from the special symbols, and then reaches decision 660 which determines if all configured MPDUs on the first link, up to a configured timepoint, have been received. If the condition is met, then at check 662 a check is made if it should optionally perform a quick Ack on the second link. If the condition is not met, then execution returns to check 660; otherwise, execution moves to block 664 in FIG. 17.

Returning to consider check 660, if the condition is not met, then execution also moves to block 664 in FIG. 17.

Considering determination of choice (2) from block 654, then block 658 is reached which applies a quick Ack configuration from the pre-configuration, and then reaches block 660 which was previously described.

Considering determination of choice (3) from block 654, then block 672 is reached in FIG. 17 which performs a normal Ack/BA on the first link, then execution moves back to block 652.

At block 664 of FIG. 17, a quick Ack is performed on the second link, and then check 666 is performed which determines if a Ack to a quick Ack or retransmission has been received. If the condition is not met, then execution returns to block 664.

Otherwise, at block 668 quick retransmission is received on the first or second link based on the configuration, then check 670 is reached which determines if the first link PPDU has been completed. If the quick Ack is completed, then at block 672 a normal Ack/BA is performed on the first link and execution returns to block 652. If the quick Ack was not completed, then execution moves from check 670 to check 660 in FIG. 16.

Figure 18:
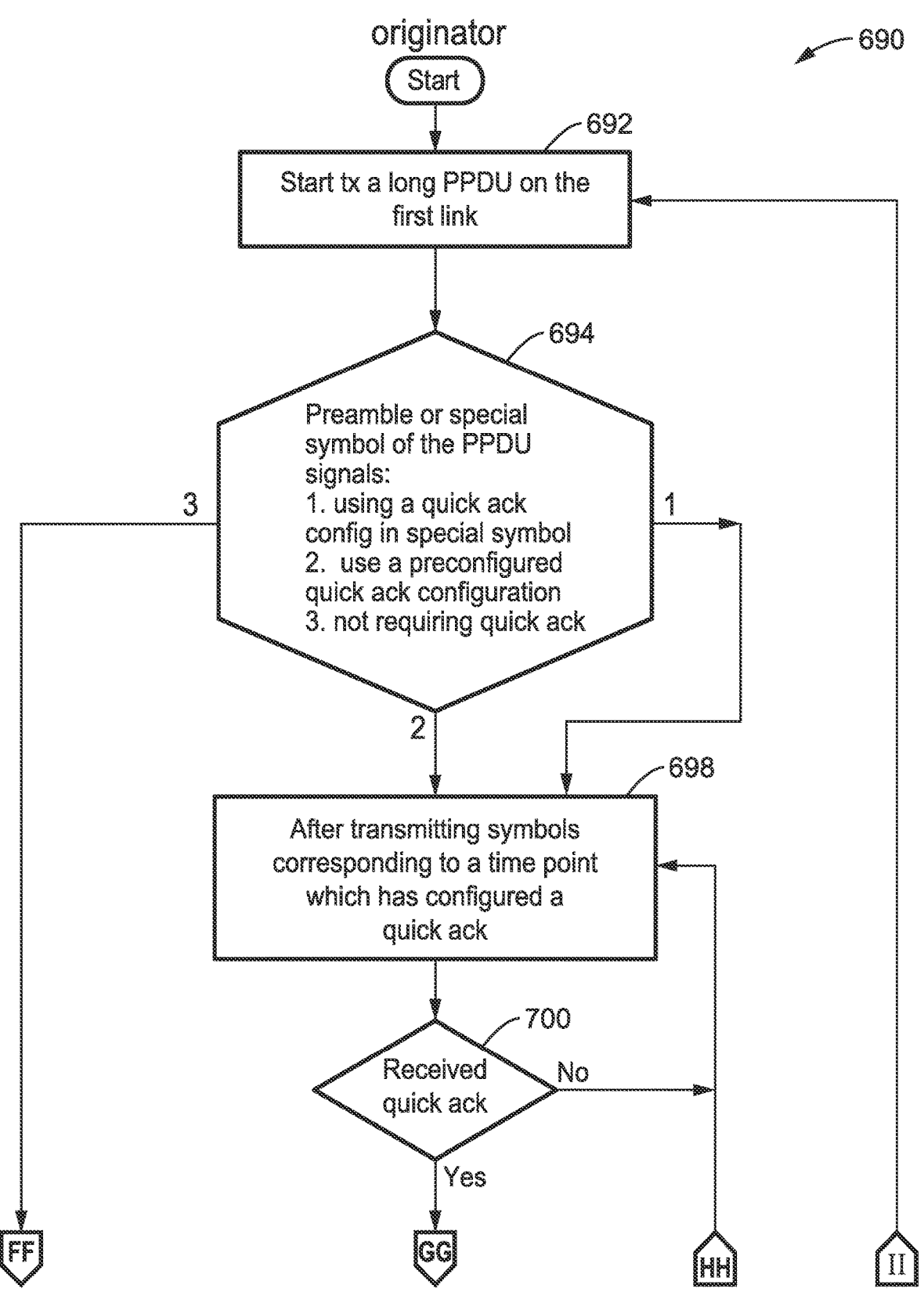
FIG. 18 and FIG. 19 is a flow diagram of originator processing of a long PPDU requiring an Ack, according to at least one embodiment of the present disclosure.
Figure 19:
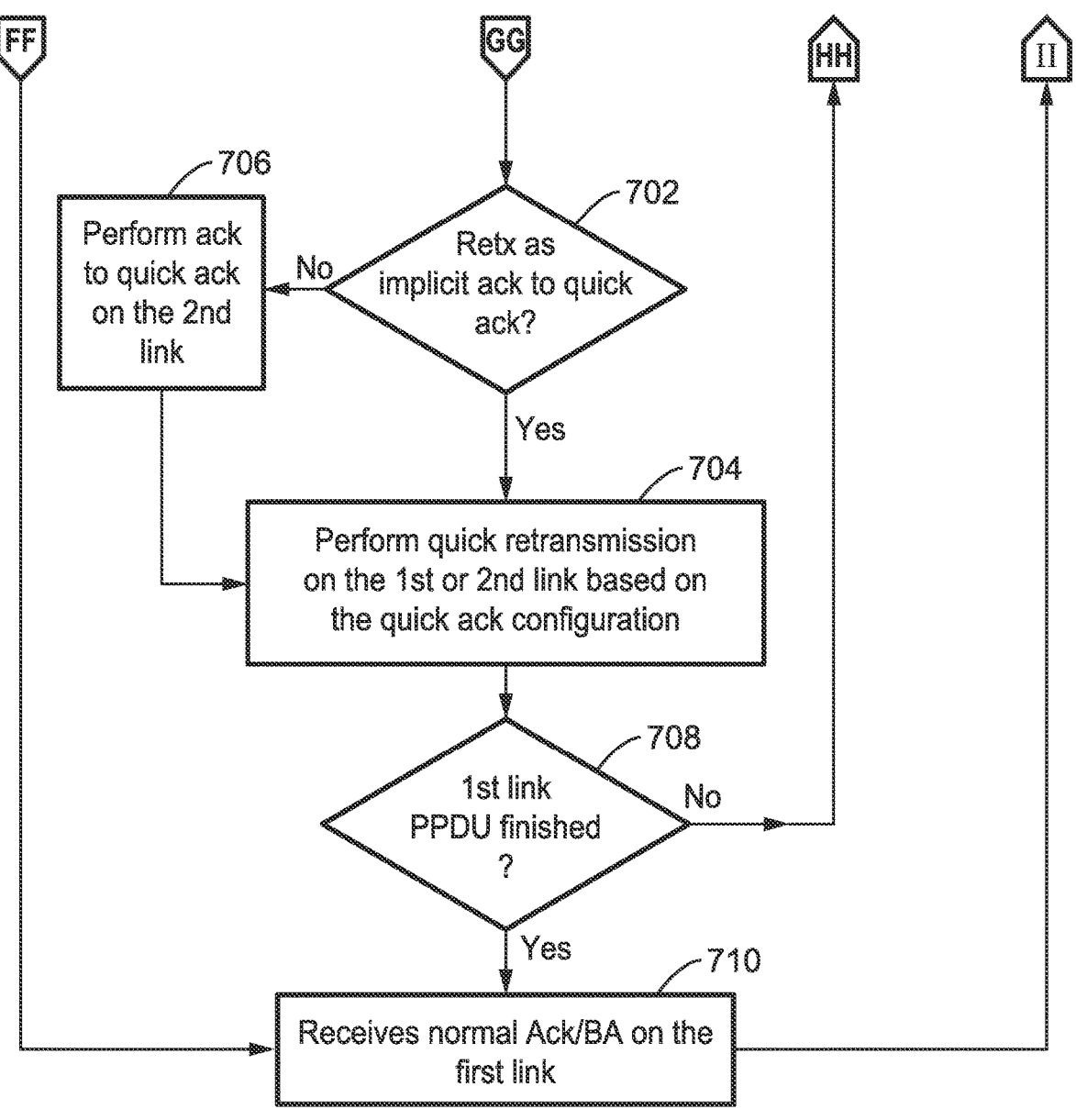

FIG. 18 and FIG. 19 illustrate an example embodiment 690 of originator processing of a long PPDU requiring an Ack. At block 692 the originator starts transmission of a long PPDU on the first link. At decision 694 it is determined which type of preamble or special symbols. Choice 1 is using a quick Ack configuration in special symbols, Choice 2 is using a preconfigured quick Ack configuration, and Choice 3 is not requiring a quick Ack.

If choice 1 or choice 2 is selected, then at block 698 after transmitting symbols corresponding to a time point in which a quick Ack has been configured. Execution reaches check 700 which determines if a quick Ack has been received. If the condition is not met, then execution moves back to block 698.

If the condition is met then execution moves to check 702 in FIG. 19, where the originator determines if a retransmission should use implicit Ack to perform the quick Ack. If the condition is not met, then at block 706 the originator performs an Ack to quick Ack on the second link, and execution reaches block 704.

Otherwise, if the condition of check 702 is met, then at block 704 a quick retransmission is performed on the first or second link based on the quick Ack configuration. Execution reaches check 708 which determines if the first link PPDU has been completed. If the PPDU is not completed, then execution returns to block 698 of FIG. 18. Otherwise, at block 710 the originator receives a normal Ack/BA on the first link, with execution returning to block 692 of FIG. 18.

Considering the other choices in block 694 of FIG. 18, if choice 3 is selected, then execution moves directly to block 710 of FIG. 19, which has already been described.

7. Frame Formats Embodiment

FIG. 20 illustrates an example embodiment 730 of a quick Ack configuration field. The field shows an example of the configuration described in a previous section. The field may be included in a management frame, such as ADDBA action frames as described in the section on Indication of Ack timing/Ack link in the long packet. If it is in a frame from originator to recipient, it represents the pre-configuration of quick Acks. If it is in a frame from recipient to originator, then it may represent the suggested configuration and/or the capability to perform a specific quick Ack configuration. If this is included as an element then the presence of element ID, Length, and Element ID Extension fields are implied and not shown.

The field may be included in preconfigured symbols or locations in a long PPDU. The subfields are not restricted in this specific order and there may be presence flags before the fields to indicate the presence of a particular field. The field is described by way of example and not limitation, while actual embodiments may differ, such as utilizing signaling that serves similar purposes as described below.

A Link ID bitmap subfield provides the identity of possible second links from which the originator expects a quick Ack. The transmitter of an originator uses this field to indicate the possible links that quick Ack is received. The transmitter of a recipient uses this field to indicate the possible links for which quick Ack transmission is supported. The receiver of an originator uses this field for recognizing possible links for which quick Ack is supported by the recipient for transmission. The receiver, if it is a recipient, uses this field to determine (know) which links the quick Ack transmissions are permitted.

A t0 start subfield describes the first t0 in a long PPDU in which the unit may for example be an OFDM symbol number or a time from the start of the PPDU. The transmitter of an originator uses this field to indicate the first t0 in a long PPDU. The receiver of a recipient uses this field to determine the first t0 in order to perform transmission of a quick Ack. The subfield may be omitted if the field is transmitted by the recipient.

A t0 period subfield indicates duration between two consecutive t0's if there are multiple t0's. The units may be represented in OFDM symbols. The transmitter of an originator uses this field to indicate the periodicity that the quick Ack is requesting. The receiver of a recipient uses this field to determine (calculate) the subsequent t0 of the quick Ack with subfields t0 start and t0 count. There may be multiple instances of t0 configured within the duration of the long PPDU sent on Link1. The multiple instances of t0 may follow a periodicity which is provided in this subfield. The subfield may be omitted if the field is transmitted by the recipient.

A t0 count subfield indicates the number of t0s if there are multiple t0's. The transmitter of an originator uses this field to indicate the number of quick Acks that are requested. The number must be less than or equal to the supported number indicated by the recipient if such information was provided. The receiver of a recipient uses this field to determine t0 for the subsequent quick Ack with the subfields t0 start and t0 periodicity. There may be multiple instances of t0 configured within the duration of the long PPDU sent on Link1 as indicated in this subfield. The transmitter of a recipient may use this field to indicate the maximum (max) number of t0's supported per PPDU. The receiver of an originator may use this subfield to determine the setting of the subfield sent to the recipient.

A Max t2-t1 subfield provides a preconfigured duration. In at least one embodiment, the units are OFDM symbols. This field may be set to a reserved value to indicate that the mechanism in not used. The transmitter of an originator uses this field to indicate the preconfigured duration. The receiver of a recipient uses this field to determine a timeout within which an implicit Ack to quick Ack should be received. The subfield may be omitted if the field is transmitted by the recipient.

A Receiver (Rx) Suggested/demanded MCS/NSS subfield in at least one embodiment comprises a flag that indicates whether the originator expects a recipient feedback suggesting MCS/Nss. If the flag is set to a first state of true, then the following two fields (reTx MCS, reTX Nss) may be reserved or omitted. The transmitter of an originator uses this field to indicate whether the recipient should provide a suggested MCS/Nss or demand MCS/Nss of the quick retransmission. If the originator does not want the recipient to suggest or demand a quick retransmission MCS/Nss, it should set this subfield to false and indicate retransmission (reTx) MCS/Nss (the following subfields) of the NAV determination for quick retransmission following the quick Ack on the link which the quick Ack is transmitted, or if the MCS/Nss is not explicitly signaled in the quick retransmission, or in the trigger of the quick retransmission. The receiver of a recipient uses this field to determine whether it should suggest or demand MCS/Nss for quick retransmission in the quick Ack. The recipient may also use the suggested or demanded MCS/Nss to determine NAV if the quick retransmission follows the quick Ack on the link upon which the quick Ack was transmitted on. The transmitter of a recipient uses this field to indicate whether it supports including a suggested/demanded MCS/Nss in the quick Ack. The receiver of an originator uses this subfield to determine how to set the same subfield from the originator to the recipient.

A retransmission (reTx) MCS subfield indicates the MCS (or the offset to the MCS of the original transmission) of the quick retransmission. The transmitter of an originator uses this field to indicate the (minimum) MCS or the offset to the long PPDU MCS for the quick retransmission. The receiver of a recipient uses this field to determine the MCS of the quick retransmission, if such information was not explicitly indicated in the quick retransmission or in the trigger of the quick retransmission. The receiver of a recipient also uses this subfield to determine NAV if the quick retransmission follows the quick Ack on the link upon which the quick Ack is transmitted. The subfield may be omitted if the field is transmitted by the recipient.

A retransmission (reTx) Nss subfield indicates the Nss (or the offset to the Nss of the original transmission) of the quick retransmission. The transmitter of an originator uses this field to indicate the (minimum) Nss or the offset to the long PPDU Nss for the quick retransmission. The receiver of a recipient uses this subfield to determine the Nss of the quick retransmission if such information was not explicitly indicated in the quick retransmission or in the trigger of the quick retransmission. The receiver of a recipient also uses this subfield to determine NAV if the quick retransmission follows the quick Ack on the link upon which the quick Ack is transmitted. The subfield may be omitted if the field is transmitted by the recipient.

A TID bitmap subfield identifies the TIDs that should be reported in the quick Ack. The transmitter, if an originator, uses this field to indicate which TIDs received should be included in the quick Ack. The receiver, if a recipient, uses this field to determine the set of MPDU(s) whose receiving status is supposed to be included in the acknowledgement frame at t0. The subfield may be omitted if the field is transmitted by the recipient. This subfield may be omitted if included in a management frame whose scope is limited to a particular TID, such as an ADDBA Request frame.

An On Demand t0 subfield may be implemented as a flag which indicates that t0 is determined such that the originator may use training symbols or delimiters to indicate there are inserted RTA MPDUs before or after the indication. The preconfigured t0 may be implicitly replaced by either a modified delimiter or the inserted training symbols, which makes t0 an "on demand" t0. If the flag indicates true, the t0 start/period/count fields may be omitted or reserved. The transmitter of an originator uses this field to indicate t0 as determined by the mechanism described above. The receiver of the recipient uses this field to recognize whether it should apply the preconfigured quick Ack. If set to true, the preconfigured t0s are replaced by the t0 which is dynamically signaled. The transmitter of a recipient indicates whether the recipient supports the on-demand t0. The receiver of an originator uses this field to avoid using mechanisms for recipients not supporting the feature.

A retransmission (reTx) on quick Ack TXOP subfield indicates that the quick retransmission follows the quick Ack on the link from which the quick Ack is transmitted. This indicates that the recipient may allocate a NAV in a quick Ack for quick retransmission. The transmitter of an originator uses this subfield to indicate that it will perform a quick retransmission following the quick Ack on the link on which quick Ack is transmitted. The receiver of a recipient uses this subfield to determine that it should reserve a TXOP in quick Ack, such that a quick retransmission following the quick Ack on the link on which quick Ack is transmitted can be performed. The transmitter of a recipient uses this field to indicate that it supports reserving TXOP and receiving a quick retransmission following the quick Ack on the link on which the quick Ack is transmitted. The receiver of an originator uses this field to determine whether it should set the same subfield to true if the recipient indicated support.

FIG. 21 illustrates an example embodiment 750 of a Special Symbol configuration field. The field may be included in a management frame. If this Special Symbol configuration field is in a frame being transmitted from originator to recipient, then it represents pre-configuration of special symbols of a long PPDU that requires a quick Ack. If this Special Symbol configuration field is in a frame from the recipient to originator, it may represent the suggested configuration and/or the capability to perform a specific configuration. If this Special Symbol configuration field is included as an element in the frame, then the presence of element ID, Length, Element ID Extension fields are implied and not shown. The subfields are not restricted in this specific order and there may be presence flags before the fields to indicate the presence of a particular field.

The exemplified Special Symbol configuration field is presented by way of example and not limitation, as the present disclosure contemplates other configurations which may differ yet still provide signaling which serve similar purposes as those described below.

A Special symbol MCS subfield indicates the MCS of the special OFDM symbols. If the transmitter is an originator, then it sets this field to indicate the MCS used in the special symbols. If the receiver is a recipient, then it uses the MCS value indicated in this field to receive special symbols. If the transmitter is a recipient, then it sets this field to indicate the suggested MCS value for special symbols and/or whether it is capable of receiving mixed MCS for symbols spanned by a codeword. The receiver, if it is an originator, uses this field to determine whether it can enable special symbols if supported by the recipient.

A Special symbol Nss subfield indicates the Nss of the special OFDM symbols. If the transmitter is an originator, then it sets this field to indicate the Nss used in the special symbols. The receiver, if it is a recipient, uses the Nss value indicated in this field to receive special symbols. The transmitter, if it is a recipient, sets this field to indicate the suggested Nss value for special symbols, and/or it is capable of receiving mixed Nss for symbols spanned by a codeword, and/or it is capable of using training field for non-special symbols to estimate the channel receiving the special symbols. The receiver, if it is an originator, uses this field to determine whether it can enable special symbols if supported by the recipient.

A Special symbol duration subfield indicates the duration of the special symbols. The units value in at least one embodiment are OFDM symbols, or time from the start of the PPDU. A specific value (e.g., 0) is used to signal that no special symbol is configured or supported. The transmitter, if it is an originator, sets this field to indicate the duration of special symbols in a fixed size RU/sub-channel. The actual duration is scaled inversely proportionally by a factor determined by a ratio of actual bandwidth to resource unit (BW/RU) size and the fixed size. The receiver, if it is a recipient, uses this field to determine the duration of special symbols subject to the scaling above. The transmitter, if it is a recipient, indicates the suggested duration of special symbols and/or the support of special symbols. The receiver, if it is an originator, uses this field to determine recipient support of the special symbols and determines whether to enable special symbols.

FIG. 22 illustrates an example embodiment 770 of a quick Ack configuration in special symbols, having the following subfields.

A Pre-config Override subfield indicates the presence of a quick Ack configuration field and CRC field afterwards. It indicates whether no quick Ack based on pre-configuration from prior management frame, or quick Ack based on the configuration carried in special symbols used for the PPDU. This field may be a field in the preamble instead of a field in special symbols. The transmitter/originator uses this field to indicate whether no quick Ack based on pre-configuration from prior management frame, or quick Ack based on the configuration carried in special symbol is used for the PPDU.

The receiver/recipient uses this field to determine the presence of the following Quick Ack configuration field, and the configuration/enablement of the quick Ack.

The CRC field is determined (calculated) from the content of quick Ack configuration field and possibly together with the content of the SERVICE field. The transmitter uses this field to convey the CRC of the content of the quick Ack configuration field and possibly together with the content of the SERVICE field. The receiver uses this field to check the correctness of content of the quick Ack configuration field and possibly the content of the SERVICE field. If incorrect, the recipient may not perform a quick Ack, or may perform a quick Ack indicating that no MPDUs were received, or may perform a quick Ack based on a pre-configuration instead of the configuration indicated in the Quick Ack configuration field.

FIG. 23 illustrates an example embodiment 790 of a Shared Ack Configuration element which may be included in a management frame. If it is in a frame from originator to recipient, it represents the pre-configuration of the shared Ack RU from the AP on a second link in a DL long PPDU. If it is in a frame from recipient to originator, it may represent the suggested configuration and/or the capability to perform a specific configuration. If included as an element, then the presence of element ID, Length, Element ID Extension fields are implied and not shown. The subfields are not restricted in this specific order and there may be presence flags before the fields to indicate the presence of a particular field. The field of the present disclosure contemplates embodiments which differ while still providing similar purposes as described below. The Shared Ack Configuration field has the following subfields.

A Shared Ack AID subfield is used for deriving STA-ID for the RU that is used as the shared Ack RU. The transmitter/AP uses this field to indicate the STA-ID that will be used in assigning the shared Ack RU in a long PPDU carrying the shared Ack RU. The assignment may be performed via the preamble of the long PPDU if the long PPDU is DL. The assignment may be performed using a trigger frame if the long PPDU is a TB-PPDU. The receiver uses this field to determine the STA-ID used for the assigned shared Ack RU it should listen for if the RU is in a DL PPDU, or the shared Ack RU it should transmit for the quick Ack, if the RU in a TB-PPDU.

A Delimiter Modulo subfield (if equals value x) represents a modulo in which every x octets in a shared Ack RU there is a delimiter signature. The transmitter sets this field to indicate that only octets with octet number modulo of the value represented by this field equal to 0 can be used as the starting octet for delimiter signature. The receiver uses this field to recognize that only octets with octet number modulo with the value represented by this field equal to 0 can be used as the starting octet for delimiter signature.

Figure 24:
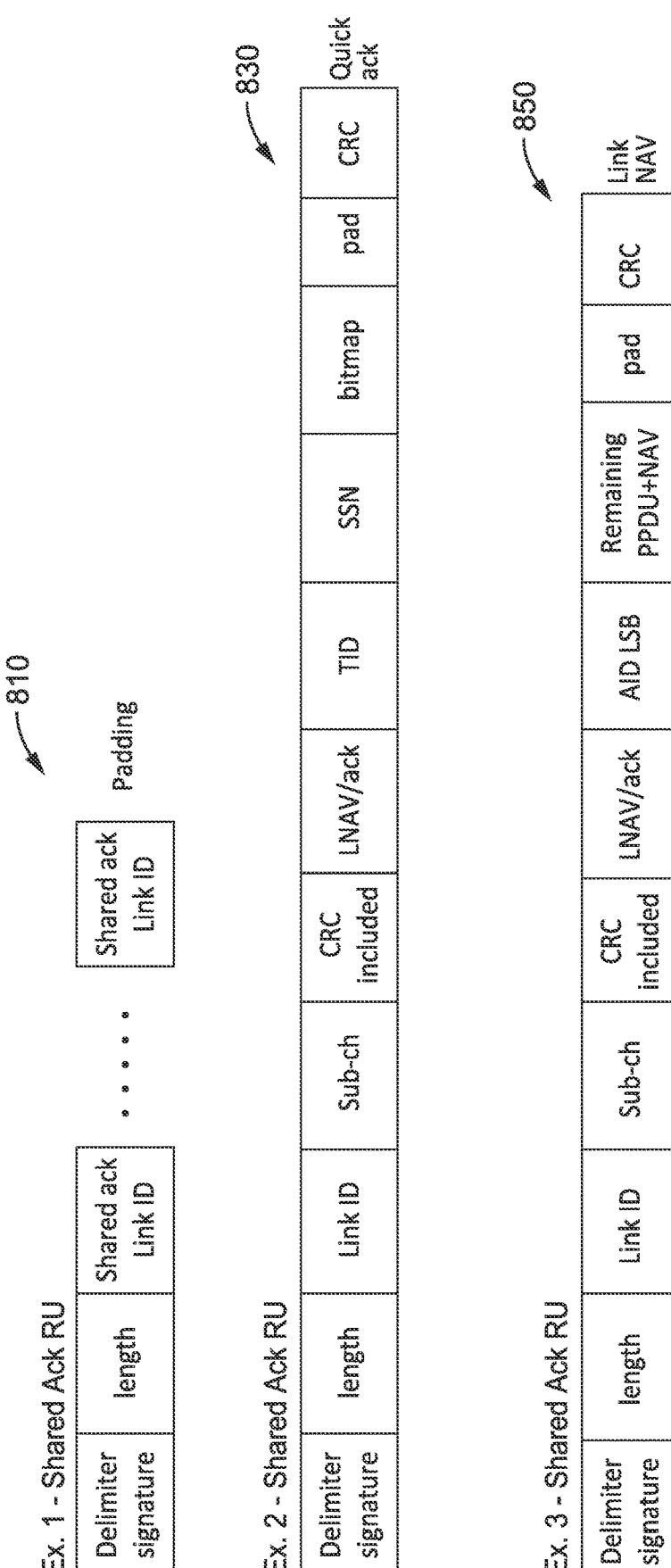
FIG. 24 is a data field diagram of different Shared Ack RU element examples, according to at least one embodiment of the present disclosure.

FIG. 24 illustrates an example embodiment 810, 830 and 850 of a Shared Ack RU element. The following describes three examples of configurations of octets carried in a shared Ack RU between one delimiter signature field to the next signature field (not shown): padding 810, quick Ack 830 or LNAV 850. The subfields are not restricted in this specific order and there may be presence flags before the fields to indicate the presence of a particular field. The field is described by way of example and not limitation whereby the present disclosure encompasses embodiments which differ while still providing similar purposes as described below. These embodiments have the following subfields.

A Delimiter signature subfield contains a special pattern of bits that signals that the next field is a length field. The field can only be located at certain octets that satisfy the octet modulo described in the previous page.

A Length subfield indicates the length of fields that follow the length field until the next delimiter signature. The transmitter uses this field to indicate the number of octets which do not comprise padding, until the next delimiter signature, or end of transmission. The receiver uses this field to determine the beginning of the pad before the next delimiter signature/end of transmission.

In the padding shared Ack RU 810, one or more shared Ack Link IDs are provided, while the remaining examples 830 and 850 have a link ID subfield, as well additional subfields.

A Link ID subfield indicates the identity of the link to which the following LNAV, or quick Ack apply. If the link ID is the same as the ID of the link that carries the shared Ack RU, then the octets until the next delimiter signature are used as padding. The transmitter uses this field to indicate the link ID that corresponds to the PPDU reception that the quick Ack responds to, or the link NAV is associated with.

The receiver uses this field to determine the identity of the link quick Ack it is responding to, or the link NAV it is associated with.

A Sub-ch subfield contains the identity of a 20/40/80/160 MHz sub-channel of the link ID, or the identity of the RU of the link ID, to which the following LNAV, or quick Ack applies. The transmitter sets this field to the identity of a 20/40/80/160 MHz sub-channel of the previous signaled link ID, or the identity of an RU of the link ID, to which the following LNAV, or quick Ack applies. The receiver uses this field to identity a 20/40/80/160 MHz sub-channel of the previous signaled link ID, or the identity of the RU of the link ID, to which the following LNAV, or quick Ack applies.

A CRC Included subfield indicates whether there is a CRC field before the next delimiter signature. The transmitter uses this field to indicate the presence of a CRC field before the next delimiter signature. The receiver uses this field to determine the presence of a CRC field before the next delimiter signature.

An LNAV/Ack subfield indicates whether the following subfields preceding the next delimiter signature are utilized for quick Ack or LNAV. The transmitter uses this subfield to indicate whether the following fields until the next delimiter signature is used for a quick Ack or LNAV. The receiver uses this field to determine whether the following fields preceding the next delimiter signature is utilized for a quick Ack or LNAV.

The Shared ACK RU for Quick Ack configuration of example 2 also has the following subfields.

A TID subfield indicates the TID which the quick Ack is responding to. The transmitter uses this field to indicate the TID, together with the link ID and sub-channel ID, which the quick Ack is responding to. The receiver uses this field to determine the TID, along with the link ID and sub-channel ID, which the quick Ack is responding to.

A SSN subfield indicates the starting sequence number of the following bitmap for the TID. The transmitter uses this subfield field to indicate a starting sequence number of the following bitmap for the TID indicated in the previous subfield. The transmitter uses this subfield field to determine a starting sequence number of the following bitmap for the TID indicated in the previous subfield field.

A Bitmap subfield provides a quick Ack bitmap for the TID in the link signaled in the link ID field and the sub-channel/RU signaled in the Sub-channel subfield. The transmitter uses this field to indicate the quick Ack bitmap for the TID in the link signaled in the link ID field and the sub-channel/RU signaled in the Sub-channel (Sub-ch) subfield. The receiver uses this subfield to determine the quick Ack status for the SNs represented by the bitmap for the TID in the link signaled in the link ID field and the sub-channel/RU signaled in the Sub-ch subfield.

The Shared ACK RU for the Link NAV configuration of example 3 has the following subfields as seen in the figure.

An AID LSB subfield indicates the AID of the TXOP holder in the link signaled in the link ID field and the sub-channel/RU signaled in the Sub-ch subfield. The transmitter uses this field to indicate the AID (or LSB of the AID) of the TXOP holder in the link signaled in the link ID field and the sub-channel/RU signaled in the Sub-ch subfield. The receiver uses this field to indicate the AID (or LSB of the AID) of the TXOP holder in the link signaled in the link ID field and the sub-channel/RU signaled in the Sub-ch field. The receiver may use this information to determine the presence of a hidden node. The receiver may determine if a PPDU transmission has had a collision when it is unable to detect its own AID in this field. In response to this detected collision, it may terminate its transmission early on the first link.

A Remaining PPDU duration+NAV subfield indicates the duration of the remaining PPDU plus the NAV signaled in the PPDU, possibly with the previous delimiter as the starting point for the duration. The transmitter uses this subfield to indicate the duration of the remaining PPDU plus the NAV signaled in the PPDU, possibly with the previous delimiter as the starting point for the duration. The receiver uses this subfield to determine the duration of the remaining PPDU plus the NAV signaled in the PPDU, possibly with the previous delimiter as the starting point for the duration. This subfield may be used by the receiver to determine the presence of a hidden node.

Each of these examples may include padding, and examples 2 and 3 may include a CRC subfield.

A CRC subfield provides a Cyclic Redundancy Check (CRC) of the octets that follow the CRC field of the last delimiter signature for which the corresponding included CRC was set to true. The CRC calculations described may exclude any delimiter signature and length fields. The transmitter uses this field to indicate the CRC value of the octets that follow the CRC field of the last delimiter signature that has the corresponding CRC included set to true. The receiver uses this field to indicate the CRC value of the octets that follow the CRC field of the last delimiter signature whose corresponding included CRC was set to true.

Figures 25, 26:
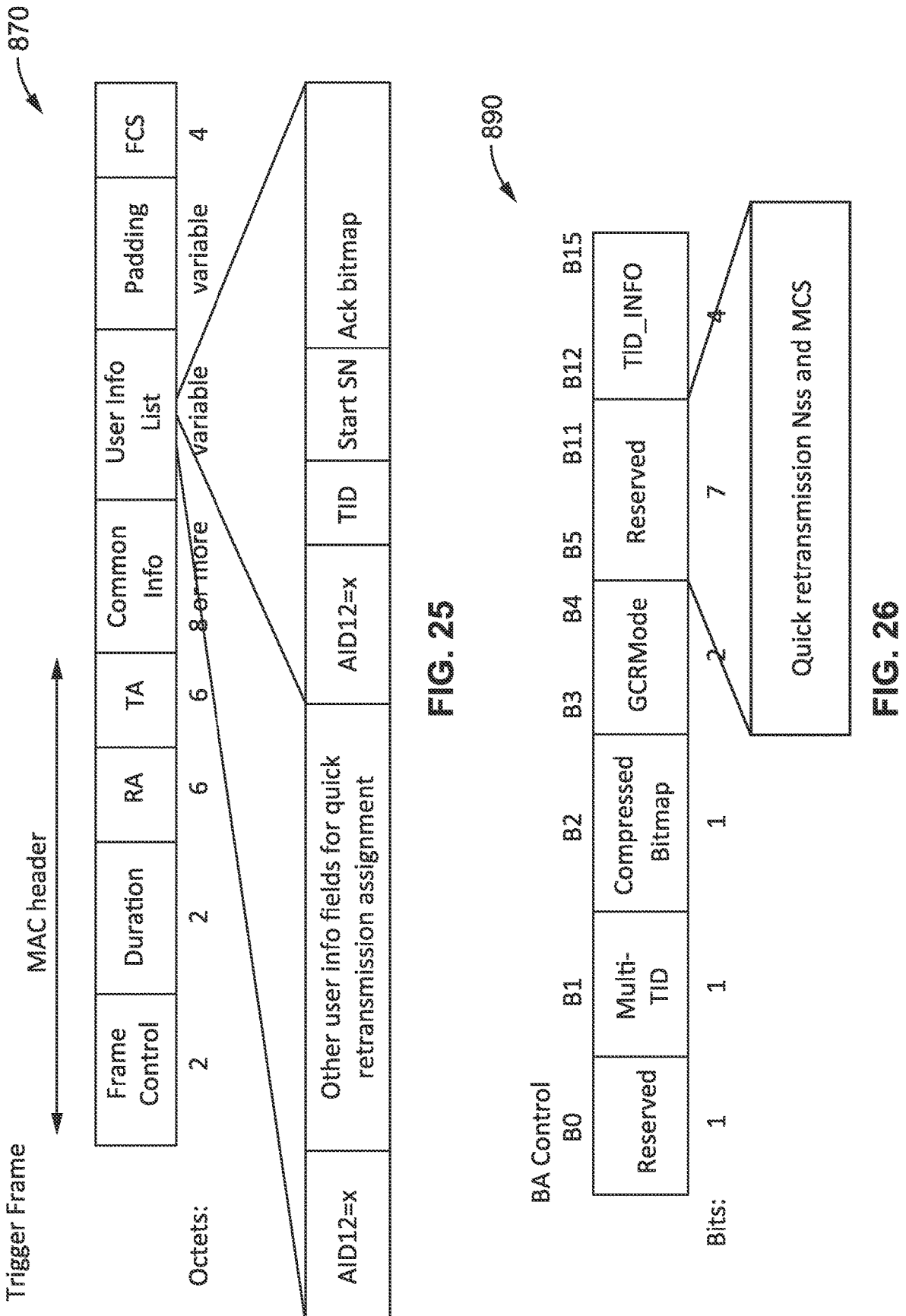
FIG. 25 is a data field diagram of a trigger frame having additional subfields within the User Info List for use with quick retransmission assignment, according to at least one embodiment of the present disclosure.
FIG. 26 is a data field diagram of a BA control field containing Quick retransmission MCS and Nss subfield within bits that were previously reserved, according to at least one embodiment of the present disclosure.

FIG. 25 illustrates an example embodiment 870 of a trigger frame having additional subfields within the User Info List for use with quick retransmission assignment. The transmitter uses the Other User Info Fields for Quick Retransmission Assignment subfield to indicate the resource assignment for the quick retransmission in the solicited TB-PPDU. The subfields of this User Info List fields, including the previous AID12 subfield, may be the same as HE or EHT variant User Info field for resource allocation for immediately following the TB-PPDU. The receiver uses this field to determine the resource assignment for the quick retransmission in the solicited TB-PPDU. The subfield of this field (including the previous AID12 subfield) may be the same as HE or EHT variant User Info field. The receiver may not find the User Info field corresponding to its own AID, in which case it does not have a quick Ack and does not perform quick retransmission.

TID/SSN/bitmap subfields are the same as subfields described in the shared Ack RU. The transmitter may indicate the same AID12 as the AID12 of the immediately previous user info field, as the indication that the current user info field is used to carry quick Ack (i.e., TID/SSN/bitmap) for the non-AP corresponding to AID12. The receiver may use the same AID12 as the AID12 of the immediately previous user info field, as an indication that the current user info field is being used to carry quick Ack (i.e., TID/SSN/bitmap) for the non-AP corresponding to AID12.

FIG. 26 illustrates an example embodiment 890 of a BA control field containing Quick retransmission MCS and Nss subfield within bits that were previously reserved.

If the Rx Suggested/demanded MCS/NSS flag is set to true from originator to the recipient, then the transmitter uses this field to indicate the MCS and Nss (or the offset to the original transmission's MCS/Nss) for the quick retransmission. The field may also indicate whether the indicated retransmission configuration is a demand or suggestion by the recipient.

The receiver bases its signaled MCS/Nss and the BW/RU size of the long PPDU on link1, if the quick retransmission is performed within the original link1 long PPDU, or the BW of the quick Ack, if the quick retransmission is performed after the quick Ack on the same link as quick Ack, to perform quick retransmission. If MCS/Nss is demanded, then the originator must use the indicated MCS/Nss for the quick retransmission. If MCS/Nss is suggested, then the originator may use a different MCS/Nss, such as a higher MCS/Nss, than the one indicated for the quick retransmission.

8. Outline Summary of Inventive Elements

The following is an outline of the features and elements of the present disclosure, including various cross-referencing of interdependencies which refer back/forward to other elements in this outline (e.g., "x" or "x.y", or "x.y.z"). This outline is not intended to limit the scope of the present disclosure, but to provide an overview of the elements and relationships.

1. The originator MLD may transmit a long PPDU on a first link. The long PPDU may consist of one or more AMPDUs to one or more recipient MLD or STAs. The first link originator and recipient MLD are abbreviated as originator or recipient in this disclosure.

2. The recipient MLD may perform an ack by sending an acknowledgement frame on a second link before the transmission of the long PPDU on the first link is completed. This is denoted as a quick ack. It is assumed the first and second link are Simultaneous Transmit and Receive (STR) link pairs for the recipient MLD;

(a) there may be a time instance t0 associated to the quick ack agreed by the originator and recipient MLD that corresponds to a set of MPDU(s) X whose receiving status is supposed to be included in the acknowledgement frame;

(b) for example, the set X may be limited to all the MPDUs that has been transmitted completely before time t0 for a set of TIDs;

(c) for example, the set X may be all the MPDUs that has been transmitted completely before time t0'; and (d) the acknowledgement frame may be a BA frame or Multi-STA BA frame.

3. The originator MLD may perform an ack to the acknowledgement frame that is sent on the second link at time t1:

(a) missing ack to the acknowledgement may be used by the recipient MLD to determine there is a collision or error of the acknowledgement on the second link;

(b) the ack to the acknowledgement frame may be sent on the second link as an immediate response to the acknowledgement frame; and (c) $t1>t0$; the difference between t1 and t0 may not be deterministic due to channel access delay on the second link; t1 is smaller than the end time of the long PPDU sent on the first link.

4. The originator may perform retransmission(s) of missing MPDU(s) in the set of MPDU(s) X described in element 2.a while the transmission of the long PPDU in element 1 is ongoing; this being denoted as a quick retransmission:

(a) the MPDU(s) in set X not reported as successfully received by the recipient MLD in the acknowledgement frame may be retransmitted if the acknowledgement frame is received by the originator MLD;

(b) the retransmission(s) may not be performed if the originator has not received the acknowledgement frame in element 2, or;

(c) the retransmission(s) may not be performed if the originator has not received the acknowledgement frame in element 2 and the frame is supposed to be sent by the recipient using EDCA.

5. The quick retransmission by the originator MLD in element 4 may take place within the same PPDU whose transmission has yet to be finished on the first link.

6. The quick retransmission by the originator MLD in element 4 may take place on the second link (on which the originator receives acknowledgement frame) or a third link supported by the recipient MLD:

(a) the second or the third link are the links to which the TIDs of MPDU(s) in set X are mapped;

(b) the recipient may use the total number of octets of set X and (e.g., minus) the octets of received MPDUs within set X and BW/MCS/Nss of the quick retransmission to derive the NAV for the acknowledgement frame sent on the second link which is immediately followed by quick retransmissions on the second link; and (c) the quick retransmission may be in the same TXOP as the quick ack in the second link, for example as immediate response to the quick ack.

7. The retransmission in element 5 may start at time t2, and t2-t1<=a preconfigured duration:

(a) t1 was described in element 3;

(b) the originator may not need to perform the ack to the acknowledgement frame described in element 3; and (c) the recipient MLD uses the start of retransmission on the first link as the ack to the acknowledgement frame sent on the second link.

8. The retransmission in element 5 may start at time t2 that has no relationship with t1:

(a) for example, the retransmission may occupy the time used for padding in the original long PPDU which may be a MU PPDU;

(b) for example, the retransmission may start at a time t2 such that the recipient MLD does not need to buffer interrupted LDPC codeword(s) while receiving retransmission;

(c) for example, the retransmission may start at a time t2 such that the recipient MLD does not need to buffer interrupted MPDU while receiving retransmission; and (d) the interruptions in elements 8.b and 8.c are caused by the retransmission.

9. The retransmission in element 5 may start with one or more training symbols:

(a) at least one of the training symbols have patterns that can be distinguished from a regular data symbol; and (b) some of the training symbols may be used by the recipient MLD for a new channel estimation.

10. The retransmission in elements 5 and 6 may have a different MCS and Nss than the MCS and Nss of the original long PPDU in element 1.

11. The recipient MLD may still be required to send a BA on the first link as an immediate response to the long PPDU in element 1.

12. The recipient MLD may not send the acknowledgement frame on the secondary link if the set of MPDU(s) X described in element 2 are all received correctly; this is because the originator MLD behavior described in element 4b or element 4c is effectively treating the acknowledgement frame on the second link as NAK.

13. The recipient MLD may send the acknowledgement frame on the secondary link if the set of MPDU(s) X described in element 2 are all received correctly; this may help originator MLD to remove the successful MPDUs from its (re)transmission buffer/advance transmission window earlier before the positive acknowledgement described in element 11.

14. A quick ack configuration information may be provided to the recipient before the quick ack; the configuration may include:

(a) t0 described in element 2, the (minimum) configuration (e.g., MCS/Nss/BW) of the quick retransmission in elements 5 and 6, the identities of the link for quick ack and quick retransmission, the TIDs whose receiving status must be included in the quick ack, the preconfigured duration described in element 7; and (b) there may be multiple instances of t0 configured within the duration of the long PPDU sent on link 1; the multiple instances of t0 may follow a periodicity which are also provided in the quick ack configuration.

15. All or part of the quick ack configuration information may be preconfigured:

(a) the pre-configuration above may be turned on or off based on a field in the preamble, or in the first several symbols in the data field of the long PPDU in element 1;

(b) the quick ack configuration may be signaled via the ADDBA request/response mechanism or other management frames prior to the data exchange; and (c) the quick ack configuration may contain differences of the MCS/Nss/BW from the original transmission.

16. All or part of the quick ack configuration information may be signaled within the long PPDU in element 1:

(a) the signaling may be in the preamble of the long PPDU;

(b) the signaling may be in the first several symbols of the data field of the AMPDU in the long PPDU, denoted as special symbols: (1) the special symbols may have a reduced MCS or Nss compared to the rest of the Data symbols; (2) the configuration of the special symbols may be signaled via the ADDBA request/response mechanism or other management frames prior to the data exchange.

17. The (suggested/demanded) configuration of quick retransmission may be included in the quick ack; the configuration may include the (minimum/maximum) MCS or (minimum/maximum) Nss of the quick retransmission; the originator MLD may not use the suggested configuration for quick retransmission; and the originator MLD may be required to use the demanded configuration for quick retransmission.

18. Enabling of a quick ack configuration may not have been determined at the start of the long PPDU:

(a) for example, The MSDU of the TID i that requires (is preconfigured for) quick ack has not arrived at MAC layer at the start of the long PPDU; the originator would not know to solicit a quick ack at the start of the long PPDU, for example the preconfigured quick ack is not turned on in the preamble in element 15;

(b) the originator may change the content of parts of AMPDU yet to be transmitted to include the newly arrived MPDU of TID i that is preconfigured for quick ack;

(c) the originator may set the reserved bit of a delimiter that is inserted after the inserted newly arrived MPDU of TID i, to '1', denoted as modified delimiter: (1) The MPDU length field of the delimiter with reserved bit set to 1 may represent the total length of the TIDs (e.g., TIDi) that are preconfigured for quick ack and are transmitted before the delimiter; (2) More than one of such modified delimiter may be inserted after the inserted MPDUs of TIDi, to avoid some delimiters received in error; (3) The appearance of the modified delimiter in a received AMPDU indicates a preconfigured quick ack configuration is turned on; the time when the modified delimiter is transmitted may implicitly replace the t0 in the preconfiguration; and (4) the info in (a) may be used for setting NAV for the acknowledgement frame in element 6 which is immediately followed by quick transmissions on the second link; the recipient may use the length signaled in element 18.a. and (e.g., minus) the length of corrected received MPDUs that are preconfigured for quick ack, and the quick retransmission MCS/Nss/BW, to determine the NAV; and (d) the originator may insert one or more training symbols as described in element 9 preceding and/or following the inserted newly arrived MPDU of TID i; this signals the quick ack is turned on: (1) the time when the training symbol is transmitted may implicitly replace the t0 in the preconfiguration; and (2) the number of symbols between the preceding and following training symbols, may be used for setting NAV for the acknowledgement frame in element 6 as in element 18.c.(4).

19. The recipient sends an acknowledgement as the immediate response to the quick retransmission on the second link described in element 6c:

(a) the acknowledgement not only reports the status of the retransmission, but it can also serve as a second quick ack to the on-going long PPDU on the first link; in this case, the first quick ack, the first quick retransmission, and the second quick ack (+ack to first quick retransmission) are in the same TXOP on the second link; and (b) the recipient may delay the transmission of the first quick ack (e.g., wait at EDCA counter 0) or the originator may pad the quick retransmission, in order to send the second quick ack in the same TXOP satisfying the corresponding t0 requirement in element 14b.

20. In element 6c, if the recipient is an AP MLD, the quick ack may be aggregated/integrated to Trigger frame(s):

(a) if the long PPDU on the first link is a TB-PPDU, then the AP may multiplex quick acks to several non-AP MLDs in a DL OFDMA PPDU, with PSDU to each non-AP MLD an AMPDU that contains quick ack and a trigger frame; and (b) the quick ack(s) may be integrated to a trigger frame that is sent to one or more non-AP STAs and also assigns resources for quick retransmission; (1) The ack bitmap, TID and start sequence number may be in a separate User Information field with a special AID or the same AID as the user's AID; the user information filed carrying quick ack may be immediately following the User Information field for the quick retransmission assignment for a non-AP MLD.

21. The previous bullets describe scenarios that the long PPDU is sent on the first link by the originator, while the quick ack is sent on a second link by the recipient and the recipient could be the TXOP holder on the second link.

22. The motivation and assumption section describes scenarios in which PPDUs are sent on the first link by the originator(s) while there is an ongoing long PPDU sent on the second link by the recipient.

23. If the recipient is an AP MLD, it may allocate a RU called shared ack RU in the long PPDU transmitted by the AP MLD on the second link.

24. The quick ack for the PPDU is transmitted in the first link is transmitted in a shared ack RU; in addition, upon successfully receiving a preamble on the first link (when AP-MLD is not already receiving another PPDU on the first link on the same frequency resource), the AP MLD may broadcast the first link NAV (the remaining PPDU duration on the first link+ the NAV of the PPDU) and the identity of the transmitter of the PPDU sent on the first link; and (a) the addressing of the shared ack RU may be based on a broadcast AID, or based on a special AID signaled to the originator non-AP MLD in advance.

25. The quick ack information transmitted in the shared ack RU may be a start sequence number (e.g., LSB only) and may be followed by a bitmap (or the number of continuously received MPDU that follow the start sequence number), and padding, and the pattern is repeated for the next group of received MPDUs; there may be a CRC and/or tail bits inserted with a preconfigured periodicity;

(a) the coding may be BCC so when a MPDU is received the status can be coded and sent on the shared ack RU immediately without a delay for a codeword;

(b) the quick ack information for an MPDU may be sent before the AMPDU finishes its transmission on the first link;

(c) the AP MLD may not send a BA/ack as immediate response to a PPDU sent by a non-AP MLD supporting the shared ack RU if all the receiving status of the PPDU has been sent in the shared ack RU as quick ack; and (d) the ack status carried in the quick ack is called quick ack information.

26. There may be a configured maximum delay between the time a MPDU is sent on the first link by the originator and the time a receiving status must be sent on the shared ack RU if the MPDU is received.

27. The NAV and identity information on the shared ack RU may signal to other non-AP MLDs operating on the first link that the first link NAV is busy, to avoid any hidden terminal issue on the first link.

(a) an RTS/CTS may not be needed for MLD supporting quick ack in the shared ack RU; and (b) the non-AP MLD may observe there is no first link NAV broadcasted in the shared ack RU to infer that its transmission to AP on the first link has collision.

28. When a PPDU1 sent on link1 from a non-AP MLD overlaps in time with two or more DL PPDUs on the second link in the same TXOP, the shared ack RUs on more than one DL PPDUs on the second link may carry the quick ack information for different MPDUs of the PPDU1.

29. The AP MLD may transmit one or more long PPDUs on the second link in the same TXOP, each with a shared ack RU; the AP MLD may transmit a control frame UL zone announcement in a legacy duplicate format on the channels of the first link; the NAV of the UL zone announcement frame overlaps with the durations of the one or more long PPDUs in the same TXOP on the second link.

30. The UL zone announcement prevents legacy STAs from accessing the first link within the NAV duration, while the non-AP MLDs supporting shared ack RU on the second link do not set NAV; in addition to the medium contention/EDCA on the primary channel of the first link, the non-AP MLDs supporting shared ack RU on the second link, may start an independent medium contention/EDCA on a secondary channels of the first link; the duplicate UL zone announcement frame on a secondary channel may allow NAV sync without a medium sync delay for the independent EDCA procedure on the secondary link;

(a) by performing multiple EDCA accesses on different channels of the same link, the situation of a lower priority user occupying primary channel stopping other higher priority user to access is avoided;

(b) the AP may require the first link access not to occupy secondary channels over certain BW using PIFS sensing procedure on the secondary channels within the NAV duration of the UL zone announcement; for example, within a UL zone, AP only allows PIFS sensing of a secondary 20 MHz channel for a PPDU BW up to 40 MHz; the BSS bandwidth of 80 MHz on the first link can be used as 2 40 MHz channels with independent accesses;

(c) because within the UL zone announcement NAV duration of the first link, AP is always receiving on primary and secondary channels on the first link, the non-AP MLDs supporting shared ack RU on the second link does not need to consider AP's activity on one channel of the first link when accessing on another channel of the first link.

31. There may be a number of the shared ack RUs on each long PPDUs on the second link to be used for the quick acks or first link NAVs corresponding to the same number of independent accesses on the first link within the UL zone.

(a) there may be a single shared ack RU on the second link and the shared ack RU multiplexes multiple quick acks/first link NAVs corresponding to the number of independent accesses on the first link within the UL zone.

32. The STAs on the first link revert to monitor the primary link only for channel access after the end of the UL zone:

(a) the PPDU occupying the primary channel on the first link starting within the UL zone, may end outside the UL zone; the PPDU not occupying the primary channel on the first link starting within the UL zone, may be required to end within the UL zone.

33. The previous elements describe scenarios in which: (1) the long PPDUs are sent from the originator(s) on the first link while the second link performs a quick ack, or (2) the long PPDUs sent from the AP MLD recipient on the second link which includes quick ack to a PPDU on the first link; in the elements below are discussed long PPDUs sent by originator(s) on the first link and long PPDUs sent from recipient(s) on the second link which includes quick ack.

34. When the originator(s) are non-AP MLD(s) on the first link while recipient is AP MLD transmits on the second link, the shared ack RU(s) in the previous section of elements may also be used for quick ack and first link NAV:

(a) if the long PPDU on the first link is a TB-PPDU, then there may be multiple shared ack RU each for a user on the first link, similar to element 31, or there is a single shared ack RU which multiplexes quick acks to multiple users on the first link, similar to element 31a.

35. When the originator is AP MLD on the first link while non-AP MLD(s) transmit on the second link a TB-PPDU:

(a) for each non-AP MLD addressed by the PPDU on the first link, there may be a corresponding ack RU assigned in the second link for quick Acking the PPDU on the first link, such as quick acks are FDM on the second link; the mapping of the user on the first link and corresponding ack RU may be signaled in the preamble of the PPDU on the first link, or in the trigger frame preceding the TB-PPDU on the second link;

(b) for non-AP MLDs addressed by the PPDU on the first link, they may use the same shared ack RU in the second link for quick Acking, such as quick acks as TDM on the second link; (1) the trigger frame which assigns the shared ack RU preceding the TB-PPDU, may provide starting time, transmission duration, periodicity corresponding to each user in the DL PPDU on the first link; (2) all non-AP MLDs that transmit on the shared ack RU at different times, may all transmit the preamble of the TB-PPDU, for protection;

(3) for a non-AP MLDs that transmits on the shared ack RU at different times, it may use the trigger frame to determine the transmit power and the correction of center frequency; each user's quick ack transmission in the shared ack RU may be preceded by a EHT-STF or EHT-LTF from the user; and (c) the Trigger Frame on the second link may not be transmitted before the DL PPDU on the first link; if the second link has EDCA access opportunity earlier than the first link, then the DL PPDU may be sent on the second link while the trigger frame and the TB-PPDU containing the ack RU may be transmitted on the first link.

9. General Scope of the Embodiment

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) in a multiple-link device (MLD), and operating as either an Access Point (AP) STA, or a non-AP STA for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i) wherein on a first link of an originating MLD, a long physical layer protocol data unit (PPDU) is transmitted comprising one or more aggregated MAC protocol data units (AMPDUs); (d)(ii) wherein said originator receives an acknowledgement (Ack) frame, as a quick Ack, from a recipient MLD over a second link before the transmission of the long PPDU by said originator on said first link has been completed; and (d)(iii) wherein said first and second link for said originating MLD and the recipient MLD are simultaneous transmit and receive (STR) link pairs.

An apparatus for wireless communication in a network, the apparatus comprising: (a) a wireless communication circuit, as a wireless station (STA) in a multiple-link device (MLD), and operating as either an Access Point (AP) STA, or a non-AP STA for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i) wherein on a first link of an originating MLD, a long physical layer protocol data unit (PPDU) is transmitted comprising one or more aggregated MAC protocol data units (AMPDUs); (d)(ii) wherein said originator receives an acknowledgement (Ack) frame, as a quick Ack, from a recipient MLD over a second link before the transmission of the long PPDU by said originator on said first link has been completed; (d)(iii) wherein said first and second link for said originating MLD and the recipient MLD are simultaneous transmit and receive (STR) link pairs; and (d)(iv) wherein said originator MLD and recipient MLD agree to a time instance t0 associated to the quick Ack agreed by the originator and recipient MLD that corresponds to a set X of MPDU(s), whose receiving status is included in the acknowledgement frame.

A method for performing wireless communication in a network, comprising: (a) performing wireless communication in a wireless station (STA) of a multiple-link device (MLD), and operating as either an Access Point (AP) STA, or a non-AP STA for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) wherein on a first link of an originating MLD, a long physical layer protocol data unit (PPDU) is transmitted comprising one or more aggregated MAC protocol data units (AMPDUs); (c) wherein said originator receives an acknowledgement (Ack) frame, as a quick Ack, from a recipient MLD over a second link before the transmission of the long PPDU by said originator on said first link has been completed; and (d) wherein said first and second link for said originating MLD and the recipient MLD are simultaneous transmit and receive (STR) link pairs.

The apparatus or method of any preceding implementation, wherein said originator MLD and recipient MLD agree to a time instance t0 associated to the quick Ack agreed by the originator and recipient MLD that corresponds to a set X of MPDU(s), whose receiving status is included in the acknowledgement frame.

The apparatus or method of any preceding implementation, wherein set X is limited to all MPDUs that have been transmitted completely before time t0 for a set of traffic identifiers (TIDs).

The apparatus or method of any preceding implementation, wherein set X is limited to all MPDUs that have been transmitted completely before time t0.

The apparatus or method of any preceding implementation, wherein said acknowledgement frame comprises a block acknowledgement (BA) frame or a multi-STA (MU) BA frame.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:

(a) a wireless communication circuit, as a wireless station (STA) in a multiple-link device (MLD), and operating as either an Access Point (AP) STA, or a non-AP STA for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) a processor coupled to said wireless communication circuit for operating on the WLAN;

(c) a non-transitory memory storing instructions executable by the processor for communicating with other STAs; and (d) wherein said instructions, when executed by the processor, perform steps of a wireless communications protocol for said wireless communication circuit, comprising:

(i) wherein on a first link of an originating MLD, a physical layer protocol data unit (PPDU) is transmitted comprising one or more aggregated MAC protocol data units (AMPDUs);

(ii) wherein said originator receives an acknowledgement (Ack) frame, as a quick Ack, from a recipient MLD over a second link before the transmission of the PPDU by said originator on said first link has been completed; and (iii) wherein said first and second link for said originating MLD and the recipient MLD are simultaneous transmit and receive (STR) link pairs; and (iv) wherein said originator MLD and recipient MLD agree to a time instance t0 associated to the quick Ack agreed by the originator and recipient MLD that corresponds to a set X of MPDU(s), whose receiving status is included in the acknowledgement frame.

2. The apparatus of claim 1, wherein set X is limited to all MPDUs that have been transmitted completely before time to for a set of traffic identifiers (TIDs).

3. The apparatus of claim 1, wherein set X is limited to all MPDUs that have been transmitted completely before time t0.

4. The apparatus of claim 1, wherein said acknowledgement frame comprises a block acknowledgement (BA) frame or a multi-STA BA (MBA) frame.

5. The apparatus of claim 1, wherein a long PPDU is sent on the first link by said originating MLD, while the quick Ack is sent on a second link by the recipient and the recipient can be the TXOP holder on the second link.

6. The apparatus of claim 1, wherein PPDUs are sent on the first link by the originator while there is an ongoing long PPDU sent on the second link by the recipient.

7. The apparatus of claim 6, wherein if the recipient is an AP MLD, allocates a resource unit (RU), as a shared Ack RU, in the long PPDU transmitted by the AP MLD on the second link.

8. The apparatus of claim 1:

wherein a quick ack for the PPDU is transmitted in the first link is transmitted in a shared Ack resource unit (RU);

wherein upon successfully receiving a preamble on the first link, when the AP-MLD is not already receiving another PPDU on the first link on the same frequency resource, then the AP MLD broadcasts the first link network allocation ventor (NAV) for the remaining PPDU duration on the first link plus the NAV of the PPDU, and the identity of the transmitter of the PPDU is sent on the first link; and wherein the addressing of the shared Ack RU may be based on a broadcast AID, or based on a special AID signaled to the originator non-AP MLD in advance.

9. The apparatus of claim 8:

(a) wherein NAV and identity information on the shared Ack RU signals to other non-AP MLDs operating on the first link that the first link NAV is busy, to avoid any hidden terminal issue on the first link;

(b) wherein an RTS/CTS may not be needed on the first link for MLD supporting quick Ack in the shared ack RU; and (c) wherein the non-AP MLD transmitting on the first link can observe if there is no first link NAV broadcast in the shared Ack RU which indicates that its transmission to the AP on the first link has been subject to a collision.

10. The apparatus of claim 1:

(a) wherein an AP MLD transmits a long PPDU on the second link in a same TXOP, each with a shared Ack resource unit (RU);

(b) wherein the AP MLD transmits a control frame UL zone announcement in a legacy duplicate format on the channels of the first link; and (c) wherein a network allocation vector (NAV) of a UL zone announcement frame overlaps with the durations of a DL long PPDU in the same TXOP on the second link.

11. The apparatus of claim 10:

(a) wherein the UL zone announcement prevents legacy STAs from accessing the first link within the NAV duration, while the non-AP MLDs supporting shared Ack RU on the second link does not set NAV;

(b) wherein in addition to the medium contention/EDCA on the primary channel of the first link, the non-AP MLDs supporting a shared Ack RU on the second link, start an independent medium contention/EDCA on secondary channels of the first link;

(c) wherein by performing multiple EDCA accesses on different channels of the same link, the situation of a lower priority user occupying primary channel stopping other higher priority user to access that channel is avoided;

(d) wherein because within the UL zone announcement NAV duration of the first link, the AP is always receiving on primary and secondary channels on the first link, while the non-AP MLDs supporting the shared Ack RU on the second link does not need to consider the activity of the AP on one channel of the first link when accessing on another channel of the first link.

12. An apparatus for wireless communication in a network, the apparatus comprising:

(a) a wireless communication circuit, as a wireless station (STA) in a multiple-link device (MLD), and operating as either an Access Point (AP) STA, or a non-AP STA for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) a processor coupled to said wireless communication circuit for operating on the WLAN;

(c) a non-transitory memory storing instructions executable by the processor for communicating with other STAs; and (d) wherein said instructions, when executed by the processor, perform steps of a wireless communications protocol for said wireless communication circuit, comprising:

(i) wherein on a first link of an originating MLD, a long physical layer protocol data unit (PPDU) is transmitted comprising one or more aggregated MAC protocol data units (AMPDUs);

(ii) wherein said originator receives an acknowledgement (Ack) frame, as a quick Ack, from a recipient MLD over a second link before the transmission of the long PPDU by said originator on said first link has been completed;

(iii) wherein said first and second link for said originating MLD and the recipient MLD are simultaneous transmit and receive (STR) link pairs; and (iv) wherein said originator MLD and recipient MLD agree to a time instance t0 associated to the quick Ack agreed by the originator and recipient MLD that corresponds to a set X of MPDU(s), whose receiving status is included in the acknowledgement frame.

13. The apparatus of claim 12, wherein set X is limited to all MPDUs that have been transmitted completely before time to for a set of traffic identifiers (TIDs).

14. The apparatus of claim 12, wherein set X is limited to all MPDUs that have been transmitted completely before time t0.

15. The apparatus of claim 12, wherein said acknowledgement frame comprises a block acknowledgement (BA) frame or a multi-STA (MU) BA frame.

16. A method for performing wireless communication in a network, comprising:

(a) performing wireless communication in a wireless station (STA) of a multiple-link device (MLD), and operating as either an Access Point (AP) STA, or a non-AP STA for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) wherein on a first link of an originating MLD, a long physical layer protocol data unit (PPDU) is transmitted comprising one or more aggregated MAC protocol data units (AMPDUs);

(c) wherein said originator receives an acknowledgement (Ack) frame, as a quick Ack, from a recipient MLD over a second link before the transmission of the long PPDU by said originator on said first link has been completed;

(d) wherein said first and second link for said originating MLD and the recipient MLD are simultaneous transmit and receive (STR) link pairs; and (e) wherein said originator MLD and recipient MLD agree to a time instance to associated to the quick Ack agreed by the originator and recipient MLD that corresponds to a set X of MPDU(s), whose receiving status is included in the acknowledgement frame.

17. An apparatus for wireless communication in a network, the apparatus comprising:

(a) a wireless communication circuit, as a wireless station (STA) in a multiple-link device (MLD), and operating as either an Access Point (AP) STA, or a non-AP STA for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) a processor coupled to said wireless communication circuit for operating on the WLAN;

(c) a non-transitory memory storing instructions executable by the processor for communicating with other STAs; and (d) wherein said instructions, when executed by the processor, perform steps of a wireless communications protocol for said wireless communication circuit, comprising:

(i) wherein on a first link of an originating MLD, a physical layer protocol data unit (PPDU) is transmitted comprising one or more aggregated MAC protocol data units (AMPDUs);

(ii) wherein said originator receives an acknowledgement (Ack) frame, as a quick Ack, from a recipient MLD over a second link before the transmission of the PPDU by said originator on said first link has been completed;

(ii) wherein said first and second link for said originating MLD and the recipient MLD are simultaneous transmit and receive (STR) link pairs; and (iv) wherein PPDUs are sent on the first link by the originator while there is an ongoing long PPDU sent on the second link by the recipient, and wherein on condition of the recipient being an AP MLD, allocates a resource unit (RU), as a shared Ack RU, in the long PPDU transmitted by the AP MLD on the second link.

18. An apparatus for wireless communication in a network, the apparatus comprising:

(a) a wireless communication circuit, as a wireless station (STA) in a multiple-link device (MLD), and operating as either an Access Point (AP) STA, or a non-AP STA for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) a processor coupled to said wireless communication circuit for operating on the WLAN;

(c) a non-transitory memory storing instructions executable by the processor for communicating with other STAs; and (d) wherein said instructions, when executed by the processor, perform steps of a wireless communications protocol for said wireless communication circuit, comprising:

(i) wherein on a first link of an originating MLD, a physical layer protocol data unit (PPDU) is transmitted comprising one or more aggregated MAC protocol data units (AMPDUs);

(ii) wherein said originator receives an acknowledgement (Ack) frame, as a quick Ack, from a recipient MLD over a second link before the transmission of the PPDU by said originator on said first link has been completed;

(iii) wherein said first and second link for said originating MLD and the recipient MLD are simultaneous transmit and receive (STR) link pairs; and (iv) wherein a quick ack for the PPDU is transmitted in the first link is transmitted in a shared Ack resource unit (RU);

(v) wherein upon successfully receiving a preamble on the first link, when the AP-MLD is not already receiving another PPDU on the first link on the same frequency resource, then the AP MLD broadcasts the first link network allocation vector (NAV) for the remaining PPDU duration on the first link plus the NAV of the PPDU, and the identity of the transmitter of the PPDU is sent on the first link; and (vi) wherein the addressing of the shared Ack RU may be based on a broadcast AID, or based on a special AID signaled to the originator non-AP MLD in advance.

* * * * *